United States Patent [19]

Rajasekaran et al.

[11] Patent Number: 4,780,906
[45] Date of Patent: Oct. 25, 1988

[54] SPEAKER-INDEPENDENT WORD RECOGNITION METHOD AND SYSTEM BASED UPON ZERO-CROSSING RATE AND ENERGY MEASUREMENT OF ANALOG SPEECH SIGNAL

[75] Inventors: Periagaram K. Rajasekaran, Richardson, Tex.; Toshiaki Yoshino, Tokyo, Japan

[73] Assignee: Texas Instruments Incorporated, Dallas, Tex.

[21] Appl. No.: 581,443

[22] Filed: Feb. 17, 1984

[51] Int. Cl.$^4$ .............................................. G10L 5/00
[52] U.S. Cl. ...................................................... 381/43
[58] Field of Search ................. 381/43, 46; 364/513.5

[56] References Cited

U.S. PATENT DOCUMENTS

| | | | |
|---|---|---|---|
| Re. 32,012 | 10/1985 | Pirz et al. | 364/513.5 |
| 3,940,565 | 2/1976 | Lindenberg | 179/1 SA |
| 3,946,157 | 3/1976 | Dreyfus | 381/46 |
| 4,058,676 | 11/1977 | Wilkes et al. | 179/1 SA |
| 4,107,460 | 8/1978 | Grunza et al. | 381/43 |
| 4,388,495 | 6/1983 | Hitchcock | 381/43 |
| 4,412,098 | 10/1983 | An | 364/513.5 |
| 4,462,080 | 7/1984 | Johnstone et al. | 364/513.5 |
| 4,513,436 | 4/1985 | Nose et al. | 364/513.5 |
| 4,570,232 | 2/1986 | Shikano | 364/513.5 |
| 4,590,605 | 5/1986 | Hataoka et al. | 381/43 |

OTHER PUBLICATIONS

Edwards, G., "A Speech/Speaker Etc.", Conference ICASSP 80 Acoustics, Speech, Denver, Co, 1980.
Rabiner & Schafer, "Digital Processing of Speech Signals", Prentice-Hall, Inc., Englewood Cliffs, N.J., Nov. 16, 1979, pp. 490-499.

*Primary Examiner*—Emmanuel S. Kemeny
*Attorney, Agent, or Firm*—William E. Hiller; N. Rhys Merrett; Melvin Sharp

[57] ABSTRACT

Speaker-independent word recognition method and system for identifying individual spoken words based upon an acoustically distinct vocabulary of a limited number of words. The word recognition system may employ memory storage associated with a microprocessor or microcomputer in which reference templates of digital speech data representative of a limited number of words comprising the word vocabulary are stored. The word recognition system accepts an input analog speech signal from a microphone as derived from a single word-voice command spoken by any speaker. The analog speech signal is directed to an energy measuring circuit and a zero-crossing detector for determining a sequence of feature vectors based upon the zero-crossing rate and energy measurements of the sampled analog speech signal. The sequence of feature vectors are then input to the microprocessor or microcomputer for individual comparison with the feature vectors included in each of the reference templates as stored in the memory portion of the microprocessor or microcomputer. Comparison of the sequence of feature vectors as determined from the input analog speech signal with the feature vectors included in the plurality of reference templates produces a cumulative cost profile for enabling logic circuitry within the microprocessor or microcomputer to make a decision as to the identity of the spoken word. The work recognition system may be incorporated within an electronic device which is also equipped with speech synthesis capability such that the electronic device is able to recognize simple words as spoken thereto and to provide an audible comment via speech synthesis which is related to the spoken word.

20 Claims, 7 Drawing Sheets

SPEAKER-INDEPENDENT WORD RECOGNITION METHOD AND SYSTEM BASED UPON ZERO-CROSSING RATE AND ENERGY MEASUREMENT OF ANALOG SPEECH SIGNAL

BACKGROUND OF THE INVENTION

The present invention generally relates to a word recognition method and system for recognizing acoustically distinct voice commands of simple words which is speaker-independent, wherein the operator is not required to train the word recognition system. More particularly, the present invention is directed to a word recognition method and system, wherein a limited number of spoken words may be identified by comparison of feature vectors forming acoustic descriptions thereof and based upon the zero-crossing rate and energy measurements of an input analog speech signal with reference feature vectors included as components of a plurality of reference templates respectively representative of the limited number of words contained within the memory storage of a microprocessor or microcomputer. Generally, the word recognition method and system disclosed herein is of the type disclosed and claimed in copending U.S. application Ser. No. 484,730 filed Apr. 13, 1983 by Rajasekaran et al, now U.S. Pat. No. 4,712,242 issued Dec. 8, 1987; and copending U.S. application Ser. No. 484,820 filed Apr. 13, 1983 by Rajasekaran et al.

Many highly desirable applications exist where a speaker-independent speech recognition system limited in its recognition capability to a vocabulary of a small number of words could be extremely useful. For example, such a word recognition system could perform a worthwhile function in certain toys, games and other low-end consumer products. Automotive controls are another aspect where such a word recognition system could have a desirable impact. In the latter respect, many non-critical automotive control functions which normally require the driver to frequently remove his eyes from the road over which the vehicle is traveling could be accomplished by direct voice inputs by the driver. Thus, a car radio or sound system could be turned "on" and "off" in this manner through simple voice inputs by the driver. More sophisticated monitoring and computational functions as available in some cars could also be accomplished by a word recognition system as incorporated into an electronic device having speech synthesis capability, for example. In this respect, the driver of the car could verbally say "fuel" (recognizable as a key word within the limited vocabulary of the voice recognition system), which would elicit the audible reply by the dash board as synthesized speech "seven gallons—refuel within 160 miles".

A word recognition system based upon a vocabulary of a limited number of words could also be incorporated into the operation of a video game, wherein the video game would be designed to accept a limited number of verbal inputs, such as "shoot", "pull up", "dive", "left", and "right" to which the characters or objects in the video game would respond during the performance of the video game, in lieu of hand controls or in addition thereto.

The use of a word recognition system in applications of the type described hereinabove renders it unnecessary to equip the word recognition system with sizable memory storage to accommodate a large vocabulary of words. A small vocabulary of words, e.g. 2 to 20 words, if recognizable from virtually any human speaker by the word recognition system can be employed in a highly practical manner for effecting desired system responses as based upon such word recognition. To this end, a word recognition system for such applications dealing with a limited number of words is not required to recognize a word embedded in connected speech, since the recognition of isolated words as simple commands spoken by an operator of the word recognition system is adequate to effect the operation of functional components associated with the word recognition system.

It would further be desirable to combine a word recognition system having a limited vocabulary of words with a speech capability, such as via speech synthesis, wherein simple speaker-independent recognition of a small number of acoustically distinct words is performed in conjunction with speech synthesis from a common memory, preferably on a single semiconductor chip, such as a microprocessor or a microcomputer. In this instance, the word recognition system is capable of operating with a low computational load and can tolerate a modest rate (e.g. 85% accurate word recognition) of acceptable responses without excessive manufacturing costs. Thus, it would be highly desirable to provide a word recognition system as implemented with a four-bit or eight-bit microprocessor or microprocessor, togehter with relatively inexpensive analog circuitry, wherein the microprocessor or microcomputer is provided with an adequate on-board random access memory, i.e. RAM. Such an implementation would not require high speed integrated circuit chips or dedicated signal processors. Of course, a minicomputer or a main frame computer could be employed to do speaker-independent word recognition, but the expense of such an endeavor has no practical relevance to the types of applications as described herein which are cost-sensitive.

Speaker-independent word recognition by its very nature presents problems in determining the speech data content of an appropriate set of reference templates representative of the respective words. In this respect, different speakers with different regional accents must be accommodated within the general identifying characteristics of the word acoustic description as defined by the reference templates of the respective words. It may often happen that one speaker or a set of speakers with a common regional accent could consistently pronounce a certain word with certain sound characteristics not duplicated by speakers grouped in the general population category. Thus, the reference templates representative of the words comprising the limited vocabulary in a speaker-independent word recognition system should not specify any feature of a word which is not a strictly necessary feature. While it is always presumably possible to prepare a set of reference templates representative of the limited number of words included in the vocabulary of a word recognition system via empirical optimization, such a procedure is extremely time-consuming and is probably prohibitive of the generation of such reference templates by a user in the field.

The cost-sensitive nature of a word recognition system as envisioned for the types of applications described herein has particular relevance to memory requirements. Thus, in many systems where small microcomputers are to be used, the amount of program memory which might be allocated to word recognition techniques and reference templates is generally restricted, because it is not desirable to tie up too much program memory with the word recognition function. In particular, in many applications for portable devices (e.g. a calculator or watch which can receive spoken commands), a critical constraint may be imposed by the power requirements of memory storage. In this respect, the reference templates representative of words and comprising the limited vocabulary of such devices must be saved during power-off periods. Thus, the amount of memory (CMOS or non-volatile) required for reference templates representative of words in such portable devices is an important cost consideration.

A further problem to be dealt with by any word recognition system which is speaker-independent has to do with the variance between individual speakers using the word recognition system, not only in their average rate of speech, but in their timing of syllables within a given word. Since such information is not normally used by human listeners in making a word recognition decision, it will typically vary substantially among the speech patterns of different speakers.

SUMMARY OF THE INVENTION

In accordance with the present invention, a speaker-independent word recognition method and system are provided, wherein a limited number of words as spoken by any speaker in the human language can be identified with a high degree of accuracy at a relatively low cost, thereby making the word recognition system suitable for applications to toys, games and other low-end consumer products. More specifically, the word recognition system can provide a limited word recognition capability as incorporated into a relatively inexpensive four-bit or eight-bit microprocessor, for example, with adequate on-board memory storage made available by the random access memory comprising a component thereof. The word recognition system could be combined with such a microprocessor or microcomputer which also forms the basis for the controller of a speech synthesis system, wherein the memory storage afforded by the speech synthesis system also serves as the memory of the word recognition system combined therewith.

In its basic approach, the present invention contemplates the generation of a plurality of reference templates respectively representative of the limited number of words to be recognized by the system, wherein each reference template comprises digital speech data and is defined by a predetermined plurality of feature vectors arranged in a predetermined time-ordered sequence for acoustically describing an individual word. Specifically, each feature vector of the reference templates is determined by a zero-crossing rate ("ZCR") and an energy measurement ("RMS") of samples of an individual word as established by the prevalent analog speech signal characteristics as determined by a statistical analysis of a speech data for the word provided by a relatively large number of representative speakers (e.g. 100 speakers).

The "closeness" of a measured feature vector of an input analog speech signal to the word recognizing system to a feature vector of the reference template is determined by a distance metric. The reference template is then time aligned with the input analog speech signal to provide a cumulative cost (or penalty) associated with the time warp in which the output changes as a function of time with the measurements. Thus, the cumulative cost effectively indicates how poorly (or well) the input analog speech signal corresponds in "time-ordered acoustic behavior" up to the current measurement time with the reference template. After the time alignment has been accomplished with respect to each of the feature vectors as determined from an input analog speech signal with the feature vectors of the plurality of reference templates, a set of cumulative costs has been developed corresponding to the words in the vocabulary as represented by the plurality of reference templates. Thus, a set of cumulative cost profiles emerges as a function of time, and the word recognition system via comparator logic circuitry in the microprocessor or microcomputer thereof decides, based upon the cumulative cost profiles, which one of the words in the vocabulary as represented by the plurality of reference templates is the closest match to the input analog speech signal.

In more specific aspects of the invention, a further determination may be made by the logic circuitry of the microprocessor or microcomputer as to the optimum time at which a recognition decision is to be made by the comparator of the microprocessor or microcomputer. In view of the variability attendant with a determination of the beginning and ending of an input word as an input analog speech signal, it has been determined that it would be preferable to make the recognition decision in a time window, i.e. a decision window (DW), that can be associated with either the beginning or the end of the input analog speech signal representative of a word spoken by an operator of the word recognition system. It has further been determined that the word recognition system would inherently provide a bias as between pairs of certain words such that the word recognition decision may falsely decide that one word rather than the other word of the pair is the word spoken by the operator at the input of the word recognition system. A word-pair discrimination means is incorporated into the word recognition system so as to compensate for the bias caused by the tendency of one word in a given pair to be falsely recognized as the other word of the pair, thereby improving the over-all accuracy of the word recognition system in correctly identifying the word spoken by an operator at the input thereof.

A further feature of the word recognition method and system resides in the time alignment technique which is practiced in developing the cumulative cost profile. In this respect, a linear slide of the reference frames of the plurality of reference templates is accomplished through the feature vectors of the input analog speech signal.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, when read in conjunction with the accompanying drawings wherein:

DETAILED DESCRIPTION OF THE INVENTION

Figure 1:
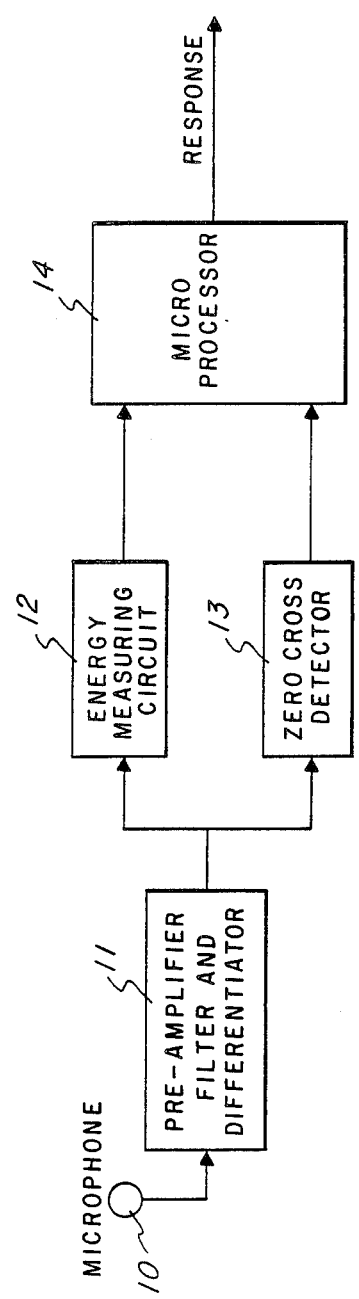
FIG. 1 is a functional block diagram of a word recognition system as constructed in accordance with the present invention.
Figure 3:
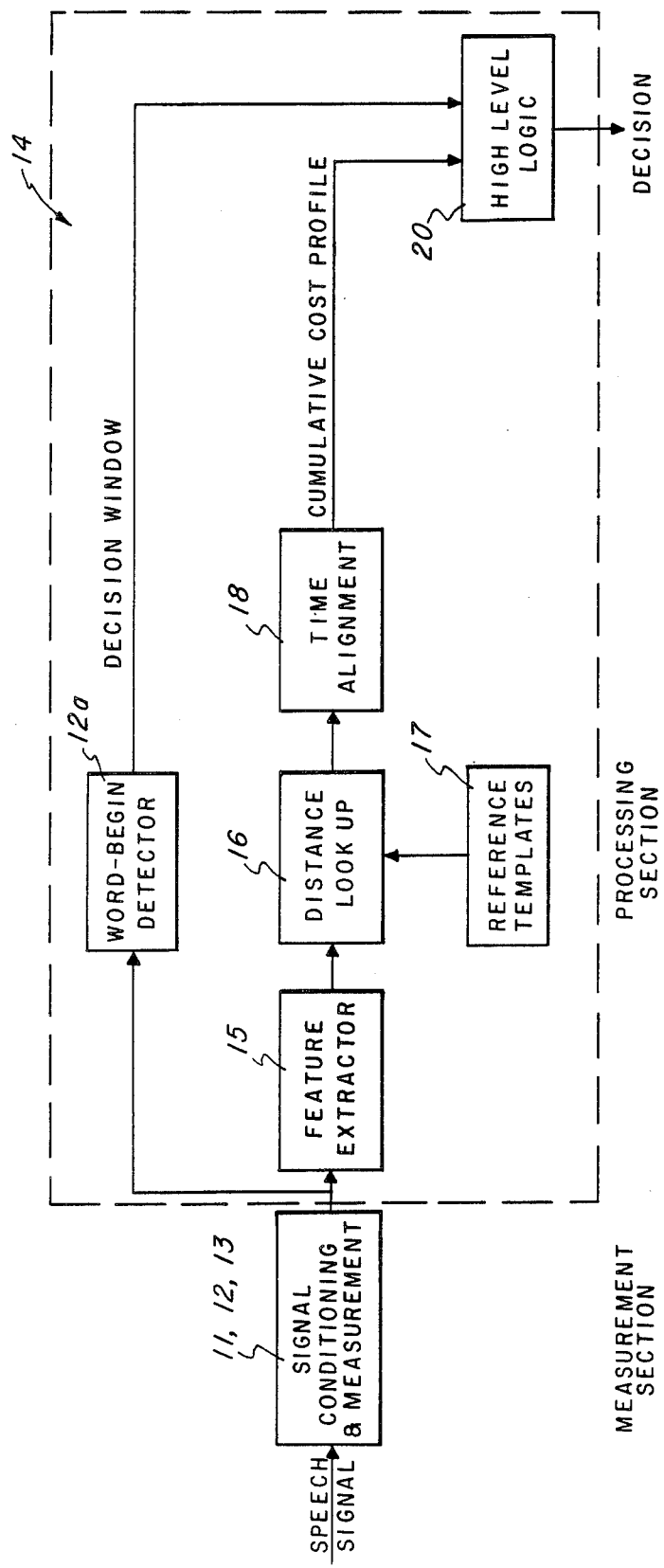
FIG. 3 is a functional block diagram of the word recognition system, similar to that illustrated in FIG. 1, but showing the functional features of the microprocessor in evaluating an input analog speech signal for word recognition purposes in greater detail.

Referring more specifically to the drawings, the method of recognizing acoustically distinct words and the word recognition system for recognizing individual words of a vocabulary set of a limited number of words are generally illustrated in FIGS. 1 and 3. The word recognition method does not require an individual speaker-operator to train the word recognition system as constructed in accordance with the present invention. The word recognition system typically has a relatively limited word vocabulary of from 2–20 words (more usually, 2–6 words) which are carefully chosen to maximize performance. The word recognition system may be constructed at a very low cost and is applicable for use in toys, games and other low-end consumer products, wherein accurate recognition of a spoken single word-voice command by the word recognition system is essential in the functional operation of the device or system of which it is a component.

Referring to FIG. 1, an individual operator-speaker may orally state any one of the words included in the word vocabulary of the word recognition system therein via a microphone 10. For example, the word vocabulary may consist of the following six words: STOP, SEARCH, SLOWER, FAST, REPORT, and GO AHEAD. The speech waveform or input analog speech signal obtained by verbally stating the one word command into the microphone 10 is then subjected to signal conditioning and measurement of acoustical descriptors of the signal word, being first subjected to a pre-amplifier filter and differentiator 11. The filter function preferably performed by the pre-amplifier filter and differentiator 11 is only a simple filtering operation. For example, a low pass filter with a corner frequency of 6.25 KHz to reject out of band signals may be employed in conjunction with an analog differentiator, wherein the differentiator effectively emphasizes the high frequency components in the input analog speech signal.

The input analog speech signal after being filtered and differentiated is passed to acoustical descriptor measurement circuits including an energy measuring circuit 12 and a zero-crossing detector 13 for providing a sequence of feature vectors based upon these measurements as acoustical descriptors of the spoken word. The outputs of the energy measuring circuit 12 and the zero-crossing detector 13 are then input to a controller means 14 which may be in the form of a microprocessor or microcomputer. In this instance, the memory resources of the controller means 14 may be utilized to provide storage of a plurality of reference templates respectively representative of each of the words included in the vocabulary of the word recognition system. Typically, the controller means 14 may comprise a four-bit or eight-bit microprocessor or microcomputer adapted to operate upon the acoustical descriptors of the input word as provided by the energy measuring circuit 12 and the zero-crossing detector 13 upon the waveform of the input analog speech signal as pre-conditioned by the filter and differentiator 11.

Figure 4:
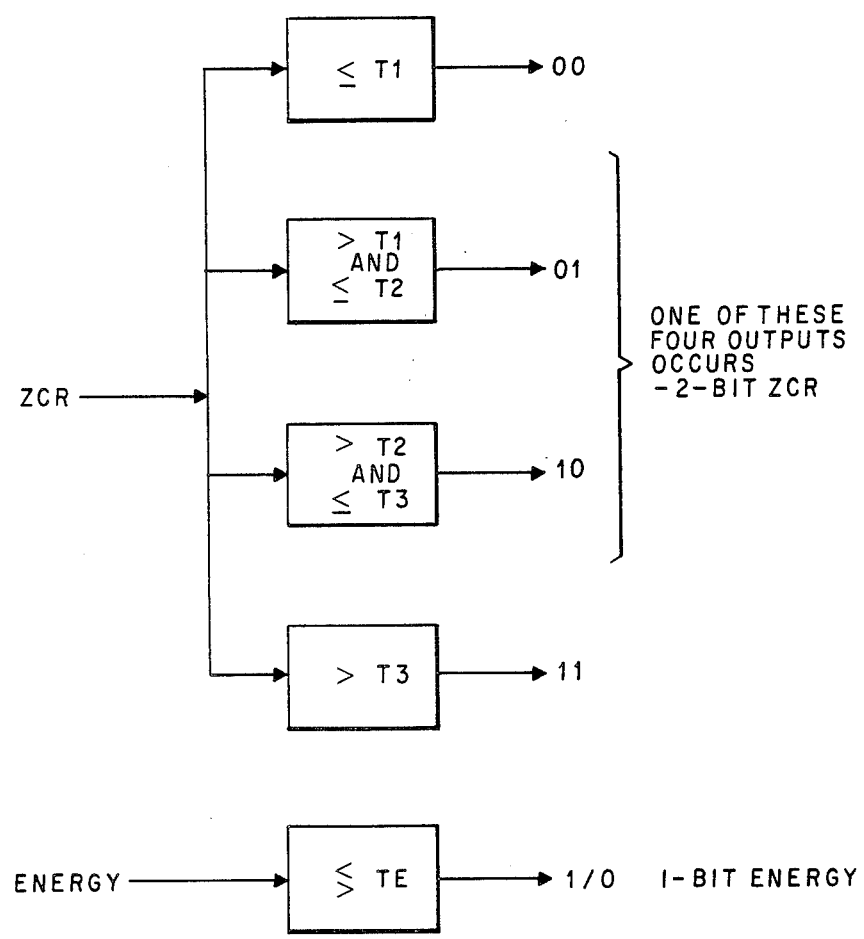
FIG. 4 is a schematic diagram of the zero crossing rate and energy measurements in defining a feature vector of the acoustic description of an individual word.

The energy measuring circuit 12 may comprise a half-wave rectifier and an RC low pass filter having an appropriate time constant and a dump feature in the simplest case for measuring the energy in a frame of speech. This measurement must be converted to a one-bit feature by means of thresholding for word recognition processing (FIG. 4). A second thresholding based upon the energy measurement and provided by a word-begin detector 12a (FIG. 3) is also required to detect the beginning of the input word. Alternatively, the energy measuring circuit 12 may comprise a capacitor, a voltage-controlled source, and a timing counter such that the capacitor is charged by the voltage-controlled source, and the time taken to discharge the capacitor at a constant current rate is counted by the timing counter to provide a reading which is generally proportional to the energy and is suitable for thresholding in the microprocessor 14 for obtaining the one-bit energy feature in the processing of the word detection logic. The zero-crossing detector 13 may comprise Schmitt trigger circuitry or a polarity-sensing saturated output amplifier, with the zero-crossing detector 13 being biased with a small DC signal to provide noise immunity.

Referring to FIG. 3, the internal functioning of the controller means 14 is illustrated, wherein the output from the signal conditioning and measurement means 11, 12 and 13 is received by a feature vector extractor 15. The feature vector extractor 15 obtains a time sequence of feature vectors which are acoustic descriptors of the input word by combining energy measurements and the zero-crossing rate (i.e. ZCR) at a frame period of 20 milliseconds and an analysis window of 30 milliseconds. The feature vector for each speech frame comprises three-bits including one-bit for an energy measurement ("high"/"low"), and a two-bit zero-crossing rate ("very low"/"low"/"high"/"very high"). The two-bit zero-crossing rate feature indicates the dominant frequency range of the speech frame, while the one-bit energy feature is helpful in separating sounds like /p/, /t/, /k/ etc. from /s/, /ch/, etc., when such separation by means of the zero-crossing rate alone becomes difficult. This three-bit feature vector is illustrated in FIG. 4, where the magnitudes T1, T2 and T3 respectively comprise three thresholds to which the zero-crossing counts are compared in generating the two-bit zero-crossing rate feature of the feature vector. Thus, the processing section of the controller means 14 converts the time-ordered measurements of energy and zero-crossings of the input analog speech signal to a sequence of feature vectors by means of the feature extractor 15.

Thereafter, the relative "closeness" of a measured feature vector comprising an acoustic descriptor of the input word to a feature vector of one of a plurality of reference templates 17 included in the memory storage of the microprocessor or microcomputer 14 is determined by a distance look-up procedure 16. The plurality of reference templates 17 of digital speech data are respectively representative of the individual words comprising the vocabulary of the word recognition system, with each of the reference templates being defined by a plurality of feature vectors arranged in a predetermined time sequence in comprising an acoustic description of an individual word. Each feature vector of a single reference template is determined by a zero-crossing rate and an energy measurement of an input analog speech signal corresponding to an individual word as generated in advance, in a manner to be hereinafter described.

Thus, the microprocessor or microcomputer 14 includes logic circuitry providing a comparator as the distance look-up means 16. The distance look-up comparator 16 compares the feature vector provided by the feature extractor 15 (comprising the three-bit feature vector illustrated in FIG. 4) with the feature vectors received from the plurality of reference templates 17 as stored within the memory provided by the microprocessor or microcomputer 14. Thus, the seat of features of an input speech frame on which comparison for word recognition is performed is selective and can vary for each frame of each reference template. In this instance, it will be understood that the plurality of reference templates respectively representative of words included in the limited vocabulary of the word recognition system as stored in the memory portion 17 of the microprocessor or microcomputer 14 each comprises a sequence of frames. Typically, each reference template could comprise a sequence of 8-12 frames as coded directly in terms of "likelihood". For any word in the vocabulary, each reference frame of a reference template is represented by eight distances in the preferred embodiment, depending upon the probability of each of the eight events described by the three-bit feature vector.

The metric distance measure as provided at the output of the distance look-up means 16 is the input to a time alignment operation 18 that time aligns the reference template with the feature vectors of the input analog speech signal. The time alignment operation 18 selects the best match of each of the reference templates to the current input frame sequence, and provides running measurements of the raw match as output which may be described as a cumulative cost (or penalty) associated with the time warping and which changes as a function of time with measurements. Thus, the cumulative cost is an indicator of how poorly (or well) the feature vectors obtained from the input word correspond in "time ordered acoustic behavior" up to the current measurement time with the reference templates representative of the respective words in the vocabulary of the word recognition system. When a complete sequence of feature vectors generated from the input word has been processed and compared with the plurality of reference templates contained in the memory portion 17 of the microprocessor or microcomputer 14, the output of the time alignment operation 18 produces a set of cumulative costs corresponding to the words in the vocabulary. Thus, as the steps of measurement of energy and zero-crossing rate by the energy measuring circuit 12 and the zero-crossing detector 13, the feature extraction of the three-bit feature vectors of the zero-crossing rate and energy by the feature extractor 15, the comparison of the feature vectors of the input word with the feature vectors of the plurality of reference templates, and the time alignment are performed, a set of cumulative cost profiles is defined as a function of time. At this point, logic circuitry 20 within the microprocessor or microcomputer 14 is called upon to decide, based on the cumulative cost profiles as so determined, which one of the words in the vocabulary as represented by the plurality of reference templates is the closest match to the spoken word comprising the input analog speech signal.

Figure 2:
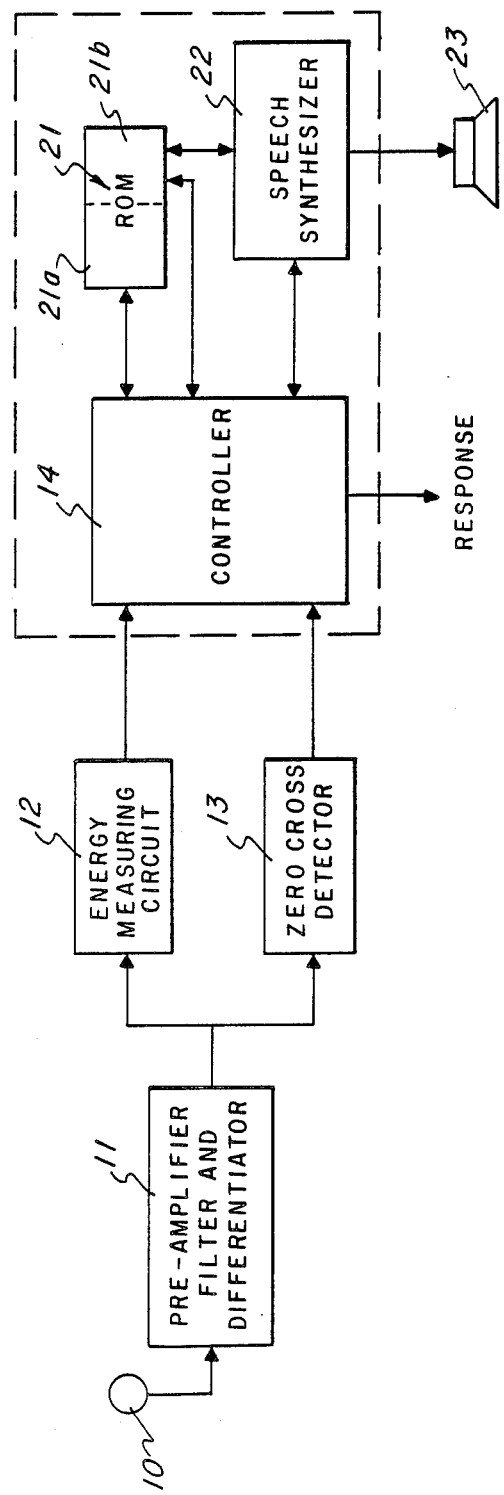
FIG. 2 is a functional block diagram, similar to FIG. 1, but showing the word recognition system as combined with a speech synthesis system and utilizing a common controller and memory therewith.

FIG. 2 illustrates a more comprehensive application of the word recognition system shown in FIGS. 1 and 3 as combined with a speech synthesis system, wherein word recognition of a spoken word by a speaker-operator may interact with a speech synthesis system such that audible synthesized speech is produced which is reflective of an identified single word command. Such a composite system has distinct applications in many fields, including toys, games, video systems and automotive control systems, etc. To this end, the controller means 14 of the composite system illustrated in FIG. 2 may comprise a microprocessor or microcomputer operative in the same manner as that shown in the word recognition system of FIGS. 1 and 3 to perform feature vector extraction, distance look-up, time alignment, and logic determination of the identity of the input spoken word. In this instance, however, the controller 14 is also included in a speech synthesis system whose further components comprise a speech memory in which digital speech data is stored, such as a read-only-memory 21, a speech synthesizer 22 and audio means in the form of a loud speaker 23 coupled to the output of the speech synthesizer 22. Like the controller 14, the read-only-memory 21 of the composite word recognition-speech synthesis system of FIG. 2 may be common to both word recognition and speech synthesis in that a first memory portion 21a of the read-only-memory 21 may be devoted to the storage of reference templates representative of words included in the limited word vocabulary of the word recognition system, and a second memory portion 21b may be devoted to the storage of digital speech data from which words, phrases and sentences of synthesized speech may be derived via selective accessing thereof through the controller 14 for input to the speech synthesizer 22 in the generation of an analog speech signal from which audible synthesized speech may be produced by the audio means 23. In this connection, each of the controller 14, the read-only-memory 21, and the speech synthesizer 22 of the composite system shown in FIG. 2 may comprise a separate integrated circuit chip, (i.e. a three-chip set) such as is disclosed in U.S. Pat. No. 4,209,836 Wiggins, Jr. et al issued June 24, 1980, wherein the speech synthesizer chip is a P-channel MOS speech synthesizer using a linear predictive coding lattice filter for digitally synthesizing human speech. Preferably, however, the controller 14, the read-only-memory 21, and the speech synthesizer 22 are incorporated into a single chip programmable linear predictive coding synthesizer, such as represented by the integrated circuit identified as the TMS 5000 manufactured by Texas Instruments Incorporated of Dallas, Tex. which is a CMOS integrated circuit device. In the latter instance, the on-board microprocessor 14 of the single chip TMS 5000 is utilized to perform simple speaker-independent recognition of a small number of acoustically distinct words. The composite system of FIG. 2 thus effectively provides a one-chip speech synthesizer having limited word recognition capability useful in many applications where an audible machine response to a spoken single word-command input would be desirable. In the latter instance, the TMS 5000 integrated circuit chip also contains an event detector which could be suitably used for attaining the zero-crossing count as one feature of the feature vectors defining the acoustical description of the spoken input word.

The individual components of the word recognition system illustrated in FIGS. 1 and 3 and the composite system of FIG. 2 and their operation will now be described in somewhat greater detail. In a specific embodiment, the pre-amplifier filter and differentiator 11 had a pre-emphasis factor of 0.9375 as applied to the speech signal output from the microphone 10. However, this pre-emphasis factor could be a different magnitude, such as even being equal to 1 (i.e. unity). The energy measuring circuit 12 and the zero-crossing detector 13 provided the two basic measurements of the acoustical descriptors of the spoken input word every twenty milliseconds (a single speech frame period) over an analysis window of 30 milliseconds, wherein the root mean square energy (RMS energy) and the zero crossing counts (ZCR) of the speech signals were measured in respectively generating the one-bit feature and the two-bit feature which are combined (as in FIG. 4) to provide the three-bit feature vector as associated with each speech frame. In this instance, the energy measurement is also used for word detection via the thresholding value of the word-begin detector 12a which may be adjustable.

Referring to FIG. 4, as previously described, the zero crossing counts are compared to three threshold values T1, T2 and T3 in generating the two-bit feature of the zero crossing rate (i.e., ZCR). The actual choice of the magnitudes of these three thresholds depends upon training tokens as used in the generation of the reference templates representative of the words in the vocabulary of the word recognition system. The three thresholds are chosen to enable a good discrimination of the different words in the vocabulary to be achieved with the resulting two-bit features as provided by the zero-crossing rate. In a specific embodiment, the actual thresholds used in a six word vocabulary of the previously described words: STOP, SEARCH, SLOWER, FASTER, REPORT and GO AHEAD, are 40, 95 and 150. These thresholds correspond to three cut-off frequencies and yield four frequency bands: (1) 0–667 Hz, (2) 667–1583 Hz, (3) 1583–3500 Hz, and (4) >2500 Hz.

The energy measurement is compared to a threshold value TE, which is generally higher than the word detection threshold to generate a one-bit energy feature. In the specific embodiment of the word recognition system, the threshold TE chosen for the six-word set was 50. It is contemplated that an adaptive threshold could be employed for the threshold value TE against which the energy measurement is compared in the generation of the one-bit energy feature of FIG. 4 to advantage in further improving the accuracy of the word recognition system in correctly identifying the input spoken word.

The filter functions provided by the pre-amplifier filter and differentiator 11 in pre-conditioning the input speech signal may be provided by a low pass filter having a corner frequency of 6.25 KHz to reject out of band signals and a differentiator for effectively emphasizing the high frequency components in the input signal. In the latter instance, the zero-crossing characteristics of a signal can easily be dominated by a strong low frequency component, and the use of the first derivative as the function on which zero-crossing analysis is performed tends to minimize this problem. In addition, the zero-crossing characteristics of a speech signal are highly sensitive to the frequency pre-emphasis and also to the phase shifting introduced by a pre-filtering section, and a wide variety of pre-filtering characteristics could alternatively be used, i.e., to provide a more critical distinction between the words in a given vocabulary set or to reject particular noise characteristics. Thus, the pre-filtering characteristics will substantially affect the extent to which perceptually distinct input speech frames are measurably distinct in the very limited information provided by the time-ordered sequence of feature vectors comprising the acoustic description of the word to be recognized.

Furthermore, a Schmitt trigger circuit as employed for the zero-crossing detector 13 performs an additional significant signal processing function, namely center-clipping. Thus, where zero-crossings to a function including noise are being measured, even a very low noise power, at moments when the function value is near zero, can introduce numerous spurious zero-crossings. To avoid this problem in word recognition, center-clipping (using the hysteresis characteristics of the Schmitt trigger circuit) in effect ignores zero-crossings unless the waveform reaches a certain minimum value between two adjacent zero-crossings. Although a Schmitt trigger circuit is not the only way to accomplish this center-clipping, some such function in the pre-conditioning of the input speech signal is desirable, since it has the effect of greatly reducing the noise in the low-interval zero-crossings.

Zero-crossing detection can be provided in a variety of ways in addition to the use of a Schmitt trigger circuit, as described herein. For example, a polarity sensing saturated output amplifier circuit may be employed to provide a strongly clipped signal from the input speech signal, i.e., a sequence of rectangular waveforms of alternating sign. These waveforms can then be converted to logic levels and provided as inputs to a microcomputer which counts each change in sign of the rectangular waveform sequence as a zero-crossing. This function could also be performed in SSI logic, with a flip-flop circuit and counters, or otherwise. The clock resolution of the microprocessor or microcomputer is preferably plus or minus 40 microseconds or less, such that a TMS 7000 integrated circuit and a TMS 2300 integrated circuit which are examples of eight-bit and four-bit microcomputers available from Texas Instruments Incorporated of Dallas, Tex. could be suitably employed. In dealing with background noise which may be responsible for causing non-speech zero-crossings, the reference templates 17 as generated for the memory storage portion of the microprocessor or microcomputer 14 in the word recognition system of FIGS. 1 and 3 or the first memory portion 21a of the read-only-memory 21 of the composite word recognition-speech synthesis system of FIG. 2 have energy weighting incorporated therein to reduce significant dependence on low energy high ZCR portions of the vocabulary words.

The feature extractor 15 of the microprocessor or microcomputer 14 produces a three-bit feature vector (FIG. 4) for each input speech frame of the input analog speech signal comprising a measurement of RMS energy and the number of zero-crossings within the frame period. In a specific embodiment, the time interval for each speech frame period was 20 milliseconds and for the analysis window was 30 milliseconds. In this instance, it should be understood that the RMS energy of the input analog speech signal may be measured over an interval which does not exactly coincide with the frame period. Thus, the energy measurement may be made over an analysis window of 30 milliseconds to provide some smoothing of the energy values between frames, and precludes missing short high-energy events.

Thus, the foregoing technique produces a feature vector (three bits in the specific embodiment) for each frame of the input analog speech signal. This feature vector is compared with various reference vectors according to a distance measure, and word recognition is made in accordance with the sequence of distance measures between the sequence of reference vectors in a reference template corresponding to a word and all or some of the sequence of input feature vectors received. The distance measure 16 is determined in accordance with the formula:

$$\text{Distance} = K*E*(1/L)*(-\log(P)),$$

where
P denotes the probability of a particular event as described by the feature vector;
E denotes the energy weighting, given by $$E = min\{\text{Beta}*e/emax, 1.\}$$

with e denoting the average RMS energy of the particular reference frame for a given training population;
emax denoting the maximum average RMS energy of overall reference frames of the word;
and Beta being an empirical constant with a typical value of 4;
L denotes the effective word length in terms of frames and is given by the sum of e/emax over all reference frames for the word; and
K is a constant to scale the value to a convenient representation.

In determining the distance measure, the factor (1-P) may be included in the above formula rather than (-log(P)) with only a slight degradation in the results. The factor (1-P) is more compatible with the previously discussed TMS 5000 integrated circuit device.

Figure 6:
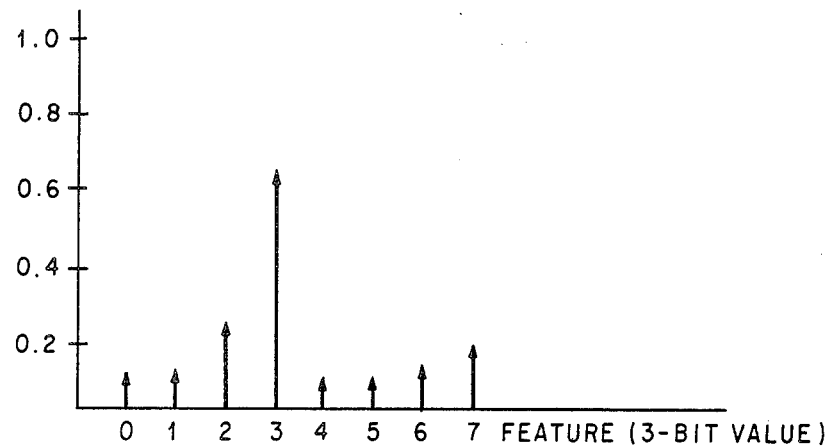
FIG. 6 is a graphical analysis of the probability distribution of a feature vector forming a portion of the acoustic description of an individual word.

FIG. 6 graphically illustrates the probability distribution of a three-bit feature vector, indicating the most probable event for the depicted feature vector to be at value three having a probability feature of approximately 0.65. This distance forms the input to the time alignment operation in which the feature vectors of the reference templates are time aligned with the feature vectors of the input analog speech signal.

The feature vectors in the plurality of reference templates 17 respectively comprises a time-ordered sequence of acoustic events as described by energy and ZCR and are coded directly in terms of "likelihoods". Thus, for any word in the vocabulary, each reference frame of a reference template is represented by eight distances depending on the probability of each of the eight events described by the three-bit feature vector, as shown in FIG. 6 and corresponding to the feature vectors making up the input analog speech signal.

Figure 7:
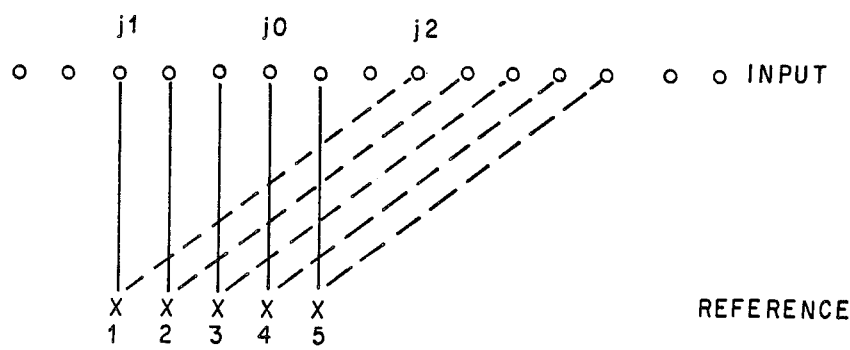
FIG. 7 is a schematic diagram illustrating a linear slide of the reference template frames through the measured feature vector of an input analog speech signal in achieving time alignment.

Referring to FIG. 7, a time alignment procedure 18 is accomplished by linearly sliding the reference frames of a reference template through the distance measurements in the generation of the cumulative cost profile, from which the minimum is picked. The minimum is picked over a decision window (DW) (FIG. 3) which may be adjustable but is typically set between 5-10 frames. This is mechanized by detecting a word-begin point via the word-begin detector 12a, and allowing a variability of 5-10 frames in the begin point estimation. To enhance performance, the decision window may also be varied in frame length depending upon the test hypothesis. For example, for the word "STOP", DW=8 frames, but for the word "REPORT", DW=5 frames. Improved performance may also be obtained by permitting a certain amount of local stretch/compress, and a time-order constraint is included. The local stretch/compress operation permits the registration of a reference frame from a reference template from among three adjacent input features of the input analog speech signal. The time-order constraint imposes the condition that the next reference frame is inhibited from registering with the already registered input frame when a future input frame is registered with the current reference frame. The solid lines in FIG. 7 correspond to the first position of the linear slide, and the dashed lines show the final position of the linear slide. A total of six cumulative costs are obtained from the situation illustrated in FIG. 7, from which the minimum is used.

Figure 8:
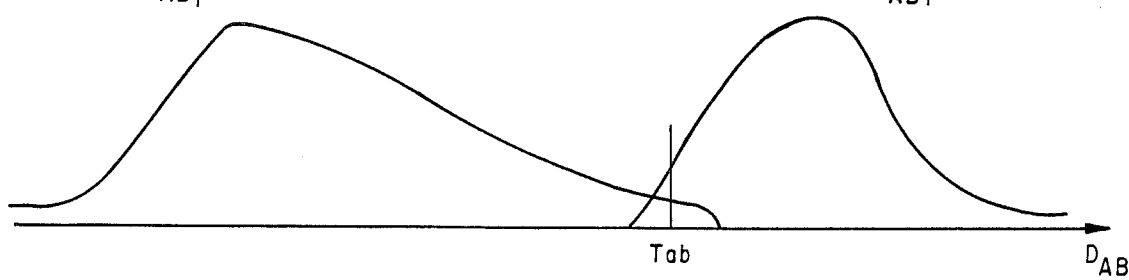
FIG. 8 is a graphical analysis of waveforms for a pair of words in which false identifications of one word are beyond acceptable limits, wherein word-pair discrimination is effected to improve the percentage of correct identifications as between the two words of the pair.

Decision logic circuitry 20 of the microprocessor or microcomputer 14 is then relied upon for interpreting the cumulative cost profiles as determined by the linear slide time alignment of FIG. 7. As earlier described, the cumulative cost profile is the factor on which the decision as to word recognition is made by the logic circuitry 20. In the usual situation, the word with the smallest possible cost over a decision window is chosen as the identity of the input spoken word. False acceptances by the word recognition system are reduced by the high level logic circuitry 20 by a technique called word-pair discrimination. In this respect, when a recognition test is performed on the training population during the generation of the reference templates 17 for use in the microprocessor or microcomputer 14, it may be found that an input word such as "STOP" gets falsely accepted as another word "SLOWER" more frequently than vice versa. This situation tends to show that the cumulative cost profiles of the two words have some non-zero bias. It has been determined that so-called ideal bias removal in the generation of reference templates is generally not adequate to provide proper discrimination between two words A and B in a given word-pair, as described hereinabove. Referring to FIG. 8, where the input words are A and B respectively, the distribution of the differential cost Dmin(AB)=Dmin(word A)-Dmin(word B). It will be observed from FIG. 8 that the distribution p(Dmin(AB)|input wor=A) has a long tail on the right which overlaps with the distribution p(Dmin(AB)|input word=B). This overlapping occurrence explains the large number of false acceptances of the word A as the word B. The converse is not true because the distribution p(Dmin(AB)|input word=B) has a short tail on the left and has only a small amount of overlap with the other distribution. Thus, it has been concluded that whenever the response (decision) is the word B, a check should be made to determine whether the differential cost Dmin(AB) is above some threshold Tab before accepting the response as the final decision. This threshold Tab should be chosen as to reduce the false acceptances and increase the correct acceptances, and the training population should be used to generate the required distributions. Thus, the word-pair discrimination logic is based upon:

If the response is word B, then
if (Dmin(AB)≦Tab) (then change the response to word A. Otherwise, the response is word B.

In the specific embodiment employing the six words: STOP, SEARCH, SLOWER, FASTER, REPORT and GO AHEAD as the word vocabulary for the word recognition system, respective word-pair associations were subjected to the foregoing logic analysis to improve the performance of the word recognition system as to the percentage of correct acceptances. The table below provides the threshold Tab for improved discrimination of individual words included in the word-pair associations.

TABLE

| THRESHOLDS FOR WORD-PAIR DISCRIMINATION | | |
|---|---|---|
| Response (Word B) | Alternative Choice (Word A) | Threshold Tab for word-pair discrimination |
| STOP | SLOWER | 200 |
| SEARCH | STOP | 100 |
| FASTER | SEARCH | 400 |
| REPORT | GO AHEAD | 300 |

Figure 5:
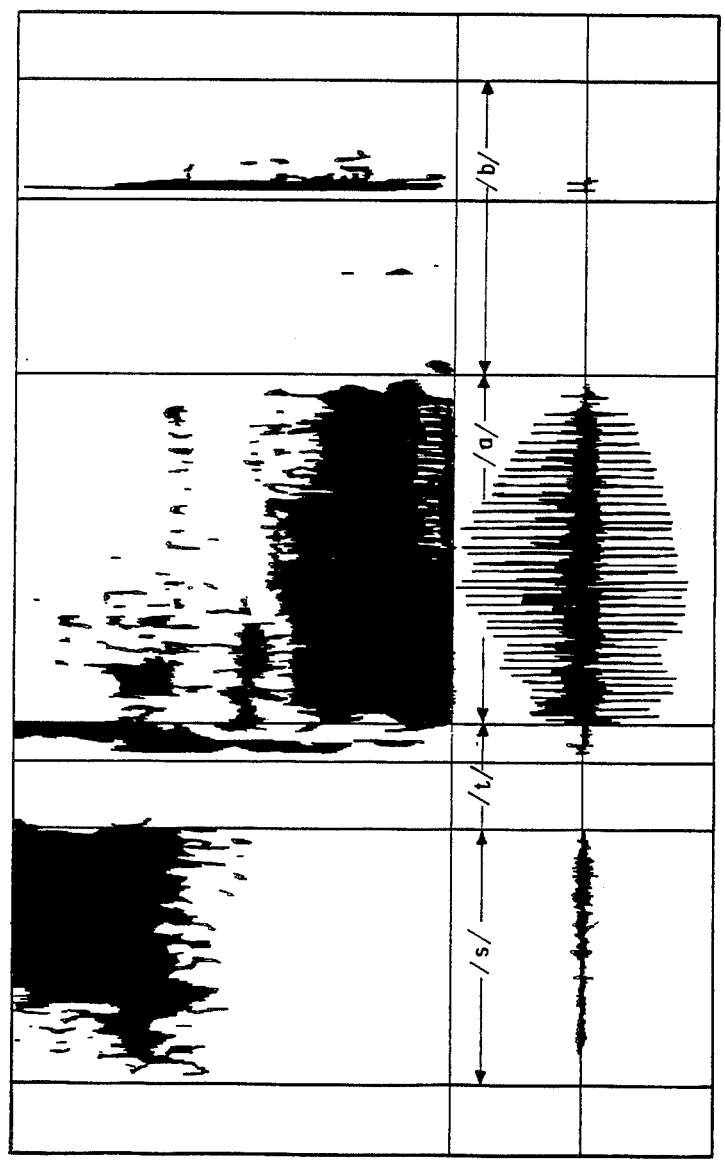
FIG. 5 is a spectrogram and waveform of an individual word for a speaker from a collection of such spectrograms forming a speaker population from which a reference template is to be constructed for use in the word recognition system.

Word-pair discrimination as practiced in the manner described reduced the substitution rate from about 16% to 13%, where practically all of the gains resulted from correct word recognition. In the generation of a reference template representative of a word included in the vocabulary of the word recognition system, a large number of independent samples of that word as pronounced by a population which is sufficiently diverse to approximate the type of speech which the word recognition system will be required to recognize are employed as a speech data base. For example, if the word recognition system in use is to be exposed to spoken word inputs from men, women and children having all of the common regional accents, then the initial speech data base should also be obtained from men, women, and children, and should also include as many as possible of the regional accent types which must be recognized in use. Assume that a reference template is to be constructed for the word "STOP". Referring to FIG. 5, the spectrogram of the word "STOP" as spoken by an adult male has six distinct acoustic segments as shown. These acoustic segments include the initial sibilant /s/, stop and release /t/, vowel portion /a/, and the final stop and release /p/. These six segments are preferably marked interactively with the aid of spectrogram and waveform plots on graphics terminals for each sample in the data base. Thus, this step manually establishes the location of corresponding acoustic segments within the data base samples. This step is used because various speakers will vary the relative lengths of different acoustic segments within a word, and it is necessary when estimating from the data samples what feature vector would correspond to a vowel /a/, that the computation be undistorted by time-warped samples in which the speaker was actually pronouncing a /t/ or a /p/. This time alignment of the samples in the data base could be accomplished in other suitable ways, such as, for example, automatic classification of the samples by acoustic segment boundaries according to linear predictive coding characteristics.

Thus, after this manual classification step, the segment within each sample in the data base which corresponds to the successive acoustic segments which must be included in the reference vector has been established. The average duration of each of the acoustic segments is then determined to establish the number of reference frames needed in each segment. For example, suppose the sibilant /s/ has an average duration of 130 msec. Then there are six reference frames in the averaged segment. These six reference frames are then located in each of the samples. In general, assume that an event of a particular sample is given by the time segment (t1, t2), both in milliseconds. Then, the i-th reference frame is located at a time given by the following formula:

$$t(i) = t1 + (t2 - t1)*(i - 0.5)/N, \; i=1, 2 \ldots N$$

where N is the number of reference frames in the segment. The total number of reference frames is the sum of such N's over all acoustic events of the word.

The probability distribution of the features at each of the registration times is now determined. The three-bit feature vector describes eight probabilistic events. For a given reference frame, each speaker's token of the word will be described by one of the eight possibilities. Over the training population of the plurality of speakers, e.g. 100 speakers, the probability histogram of the feature vector is computed. In other words, the probability of the feature vector taking any of the eight values can be estimated. FIG. 6 shows a probability distribution of a feature vector which is a discrete random variable.

The reference template for a word comprises a set of vectors,

{RF(i)}, i=1, 2, ... n(j), where n(j) is the number of reference frames for the j-th word. This vector set describes the time-ordered sequence of acoustic events of the j-th word in some sense. The reference vector RF(i) is defined by eight elements, each of which is related to the probability of occurrence of an event as described by the three-bit feature vector description of a speech frame. In a specific embodiment of the invention, the reference templates are coded in terms of the negative of log probability. From a practical standpoint, the strong (high energy) portions are given more significance than the weaker ones in considering the respective speech frames because of possible noise sensitivity. A weight is associated with each reference frame depending upon the relative energy strength of that frame. To this end, the logarithmic average of the RMS, eavg, energies at each reference time is determined and the maximum of these averages, emax, is then found. Then, the weight attached to a particular distance (negative of the log likelihood function) is determined by the formula:

$$E = min\{Beta*(eavg/emax), 1.\},$$

where Beta is an empirical constant equal to four. This technique accomplishes energy weighting in which the old distance measure is displaced by an energy weighted distance measure, such that the distance function is given by the product of the energy weight and the negative of the log likelihood function.

The generation of the reference template continues by incorporating word length normalization and ideal bias removal operations therein. Word length normalization is accomplished by summing up the energy weighting over all of the reference frames of the word to compute an effective word length of each word. The energy weighted distance is then divided by the previously obtained sum to obtain word length normalized and energy weighted distance. Thus, the cumulative cost obtained when comparing the feature vectors or acoustic descriptors of the input analog speech signal with the reference template representative of the word would correspond to an average distance per reference frame. Such cumulative costs would be fair quantities to compare even when the words in the vocabulary have significantly different durations.

The ideal bias is the cumulative cost obtained when the input analog speech signal is "ideally" the same as the word represented by the reference template. In the comparison of any input analog speech signal with a reference template, the ideal bias is removed from the cumulative cost. In this sense, because the ideal bias is a quantity that depends only on the reference template, the bias removal may be incorporated into the reference template itself. Where $\{d'(k)\}$, $k=1, 2 \ldots 8$ are the distances for a word for a particular reference frame, $d'(k)$ may be replaced to effect the ideal bias removal in accordance with the following equation:

$$d(k) = d'(k) - dmin \quad k = 1, 2 \ldots 8$$

where $$dmin = \min_{k}\{d'(k)\}.$$

Thus, each of the time-ordered set of reference vectors defining a reference template contains eight elements, each of which is a word length normalized, energy weighted and ideal bias removed negative logarithm of the probability of occurrence of an even described by ZCR and energy measurements.

The reference templates 17 are directly coded in terms of the distances of the events. The distance between an input frame of the analog speech signal as described by the three-bit feature vector and a reference frame of a reference template representative of a word is obtained by a look-up procedure (i.e., the distance measurement operation 16 of the microprocessor or microcomputer 14) of the template of the word. In this connection, the three-bit feature vector provides the address or pointer to the event. Assuming that the three-bit feature vector indicates the event j, $j=0, 1, 2 \ldots 7$, the distance to the m-th frame of the n-th word may be determined by the following relationship:

$$dis(j, m, n) = K^*\{d'(j, m, n) - dmin\}$$

with $d'(j, m, n) = E(m, n)^*(1./L(n))^*(-\log P(j, m, n))$
$E(m, n) = \min\{Beta^*(e(m, n)/emax(n), 1.\}$, the energy weighting
$e(m, n)$, the average RMS energy of the m-th reference frame of the n-th word $$emax(n) = \max_{m}\{e(m, n)\}$$

$$L(n) = \underset{m}{\text{Sum}} E(m, n),$$

the effective word length
$P(j, m, n)$ = proability of the event j occurring at the m-th frame of the n-th word $$dmin = \min_{j}\{d'(j, m, n)\},$$

the ideal bias and
K is a constant for convenient representation (i.e. would equal 100 if that many speakers are employed for the speech data base).

It should be understood that the event j as established by the foregoing procedure describes whether the input frame energy was high or low, and which one of the four frequency bands corresponds to the input ZCR.

The output from the distance measurement look-up procedure 16 in establishing a hypothesized word is now subjected to time alignment 18 which maps reference times of the hypothesized word as represented by one of the reference templates 17 with the temporal evolution of the input analog speech signal by comparing acoustic events. In this instance, the time alignment processing relies upon linear sliding as depicted in FIG. 7. Assume that the sequence of input analog speech features are $\{I(j)\}$, $j=1, 2, \ldots$, and the reference template of the word to be aligned is the sequence $\{R(i)\}$, $i=1, 2, \ldots N$. Assume that $j=j0$ is the time at which the input word is detected, i.e. the beginning of the word. Further assume that the decision window is (j1, j2), where $j1 = j0 - \Delta 1$, and $j2 = j0 + \Delta 2$, where the constants $\Delta 1$ and $\Delta 2$ may or may not depend on the hypothesized word. By way of example, $\Delta 1$ was chosen to be zero and $\Delta 2$ was chosen to be five. Referring to FIG. 7, the linear slide procedure is accomplished by first aligning the sequence of reference frames such that the first reference frame corresponds to the input j1, the second reference frame to the input at j1+1, etc. The cumulative cost is then determined by summing the distances, in accordance with the following expression $$D(k, n) = \sum_{j=1}^{j=N} dist(I(j + k - 1), j, n), \quad k = j1, j1 + 1, \ldots, j2$$

where dist (., ., .) is obtained from the expression previously set forth in describing the distance between an input frame and a reference frame of a hypothesized word as represented by a reference template.

The above expression defines a set of cumulative costs which may be termed the cumulative cost profile. In this connection, the best alignment is attained when for some k* in the interval (j1, j2), the cost D(k*, n) is less than the cost D(k, n), with k not equal to k*. That is, the input speech, starting at frame k*, and ending at k*+N is best aligned in time with the n-th word with the minimum cost of DMIN(n)=D(k*, n). Thus, a set of minimum costs DMIN(n), n=1, 2, . . . NVOCAB is obtained, where NVOCAB is the number of words in the vocabulary. In the simplest case, it may be decided that the input speech corresponds to the n*-th word when the cost DMIN(n*) is less than DMIN(n), with n not equal to n*. Employing the previously discussed word-pair discrimination procedure in the logic circuitry 20 which accepts the cumulative cost profile from the time alignment operation 18 further enhances the performance of the word recognition system in correctly recognizing the word spoken by an operator and comprising the input analog speech signal being tested.

The reference template is slid along the input speech in a manner compensating to a limited extent any variability in order and time spacing of acoustic events which might be exhibited by a simple liner slide by computing the minimum cost D(k, n) in accordance with the following expression:

$$D(k, n) = \sum_{j=k}^{j=k+N} \min \begin{bmatrix} dist(I(j + k - 2), j, n) \\ dist(I(j + k - 1), j, n) \\ dist(I(j + k), j, n) \end{bmatrix}$$

$$k = j1, j1 + 1 \ldots, j2$$

where dist (., ., .,) is determined in accordance with the previous expression for computing the distance between an input frame and a reference frame.

It is further contemplated that a monotonicity constraint could be imposed. In the latter respect, if the minimum local distance inside the summation happens to be dist (I(j+k), j, n) then for the next input frame, the minimum of dist(I(j+k−1), j, n) and dist(I(j+k), j, n) must be picked. This constraint although desirable does require increased complexity of implementation in simple microprocessors, such as the previously discussed TMS 5000 integrated circuit with an accompanying increase in the response time. The monotonicity constraint and the one frame local variability technique in the specific embodiment of the invention adapt the linear slide procedure which may be termed as the local stretch and linear slide technique of time alignment.

Figure 9A:
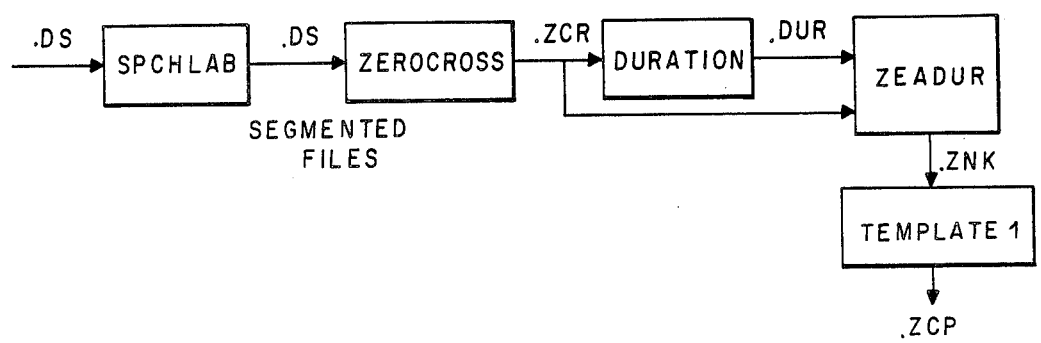
FIG. 9a is a flow chart showing the generation of a reference template.
Figure 9B:
FIG. 9b is a flow chart placing the reference template generated by the sequence shown in FIG. 9a into a form suitable for use in the word recognition system.

The present invention achieves a word recognition system of relatively low cost which may utilize a portion of the memory included in a four-bit or eight-bit microprocessor or microcomputer, while attaining a high percentage of accuracy in the recognition of a limited number of spoken words (e.g. 2–20 words) and is further implemented in the Fortran code in the attached appendix which is hereby incorporated by reference. In the latter respect, FIGS. 9a and 9b show the steps employed to generate the reference templates. An interactive graphics program SPCHLAB is employed to segment digitized speech files of the type *.ds into distinct events with segmentation time marks stored in the header. The remaining program listings shown in FIGS. 9a and 9b are presented in the attached appendix.

In a more specific embodiment, the invention may form part of a composite word recognition-speech synthesis system, such as illustrated in FIG. 2, wherein a microprocessor or microcomputer and a memory are common to the word recognition system and the speech synthesis system and may be incorporated on the same integrated circuit chip with the speech synthesizer, such as the TMS 5000 chip, as described. In the latter composite system, and in the word recognition system alone as depicted in FIGS. 1 and 3, simple analog circuitry of relatively low cost need merely be added to the input of a microprocessor or microcomputer for pre-conditioning of the input analog speech signal and providing the energy measurements and zero-crossing detection necessary to define the respective feature vectors in providing an acoustic description of the input word. It will be understood that the invention may be further embodied in microprocessors or microcomputers having greater processing power, such as 16-bit and 32-bit systems, where the longer word length would allow a larger vocabulary to be accommodated, while also facilitating the generation of the reference template representative of the words in the vocabulary in some degree.

Although preferred embodiments of the invention have been specifically described, it will be understood that the invention is to be limited only by the appended claims, since variations and modifications of the preferred embodiments will become apparent to persons skilled in the art upon reference to the description of the invention herein. Therefore, it is contemplated that the appended claims will cover any such modifications or embodiments that fall within the true scope of the invention.

```
                            APPENDIX
     to U.S. Applic    n (Docket No. TI-10152 SPEAKE    DEPENDENT WORD RECOGNITION
     METHOD AND SYST   BASED UPON ZERO-CROSSING RATE .   ENERGY MEASUREMENT OF
     ANALOG SPEECH SIGNAL - Perigaram K. Rajasekaran, Toshiaki Yoshino )
!         PROGRAM ZEROCROSS          -- 7/15 PM. PRODUCTION VERSION.
!         RMS ENERGY AND ZCR OF PRE-EMPHASIZED SPEECH ARE WRITTEN AS LPC FILES.
_C
 C<<<<<<<<<<<<<<<<<<<<<PROGRAM BEGINS>>>>>>>>>>>>>>>>>>>>>>>>>>>>>
-C
          CHARACTER*80 DSFILE,LPCFILE,PITFILE
          INTEGER*2 LPCORDER,WINDOWTYPE,RETCODE
          INTEGER*2 DSBUF(3000),dsbuf1(256),DSBUF2(256)
          INTEGER*2 KDATA(8),BIN,NOISE_LEVEL
          REAL*4 ENERGY_REAL
          INTEGER*4 NFRAMES
          INTEGER*4 IREC,NWRDS,WORDSWANT
          REAL ALPHA,FRAMEPER,WINDOWLEN,BETA
          Parameter (frameper=20.,windowlen=30.,lpcorder=0,beta=0.9375)
          CHARACTER*8 SDNAME
          CHARACTER*78 NDESCR
          INTEGER*2 LRECL
          INTEGER*2 DSLEN
          integer*2 lun1,lun2
    _C    READ ANALYSIS PARAMETERS THROUGH LUN=81.THE FOLLOWING DATA ARE
     C    READ:
```

```
C              FRAME PERIOD,WINDOW LENGTH  ! IN MILLISECONDS
C              LPC_ORDER,PRE-EMPHASIS,ENERGY RECURSION TIME CONST
!        READ (81,*)FRAMEPER,WINDOWLEN
!        READ(81,*)LPCORDER,BETA,ALPHA
         NLPC = LPCORDER
C        END READING ANALYSIS DATA FOR PROCESSING THE LIST OF
C        SPEECH FILES READ THROUGH LUN = 80. FILES ARE
C        SEQUENTIALLY PROCESSED
C        INITIALIZE THE PROCESSOR
         lun1 = 1
         lun2 = 2
         READ(80,*)NOISE_LEVEL
1000     CONTINUE
         READ(80,1)DSLEN,DSFILE
1        FORMAT(Q,A)
         IF(DSLEN.EQ.0)GO TO 1001
         LPCFILE=DSFILE(1:DSLEN-4)//'zcr'
C        OPEN INPUT AND OUTPUT FILES
         CALL SP_OPEN_OLD(lun1,'#'//DSFILE(1:DSLEN),RETCODE)
         IF(RETCODE.NE.1) GO TO 9000
5        CONTINUE
!        FIRST ENTRY POINT CALL
         CALL SP_GET_HEADER(lun1,DSBUF,RETCODE)
         IF(RETCODE.NE.1) GO TO 9000
         T=DSBUF(66)/1E6
         SAMPLE_FREQ = 1./(T*1000.)
         DSBUF1(66)= DSBUF(66)
!        copying segment information if available
         if(dsbuf(214).gt.0) then
         numbytes =   2+ (4*dsbuf(214))
         call copy(numbytes,dsbuf(214),dsbuf2(214))
         endif
         CALL ZCR_INIT(WINDOWLEN,FRAMEPER,SAMPLE_FREQ,BETA,NOISE_LEVEL)
         CALL DOUBLE(dsbuf1(117),%REF(SDNAME),4)
         CALL DOUBLE(dsbuf1(67),%REF(NDESCR),39)
         CALL SP_OPEN_NEW('#'//LPCFILE,SDNAME,28,dsbuf1(66),NDESCR,
       *  lun2,NWRDS,RETCODE)
C        IF(RETCODE.NE.1) GO TO 9000
         RETCODE=0
         IF(LPCORDER.LT.0.OR.LPCORDER.GT.32
       1     .or. frameper.le.0.0
       2     .or. windowlen.le.0.0
       3     .or. WINDOWTYPE.LT.0.OR.WINDOWTYPE.GT.1) then
                 type *,'error in input parameters in LPC analyzer',
       1             lpcorder,frameper,windowlen,windowtype
                 go to 9001
         end if
         IREC=0
         J=LPCORDER+2

C
C        MAJOR LOOP
C
         CONTINUE
40       ctime = (irec+0.5)*frameper/1E3
         call SP_GET_FRAME (lun1, ctime, windowlen, dsbuf1, npoints, retcode)
         if (retcode.eq.1601) go to 8000 !end of file, stop
         if (retcode.ne.1) go to 9000 !GET_FRAME error, stop
C        CALL TO THE MAIN ENTRY POINT
                 CALL ZCR2(DSBUF1,BIN,ENERGY_REAL)
                 KDATA(1) = ENERGY_REAL
                 KDATA(2) = BIN
                 CALL SP_WRITE(lun2,J,0,J,KDATA,RETCODE)
                 IF(RETCODE.NE.1)GO TO 9000
                 IREC = IREC + 1
         GO TO 40     ! END PROCESSING AND WRITE OUT LOOPS
8000     CONTINUE
         CALL SP_WAIT(LUN1,RETCODE)
         IF(RETCODE.NE.1)THEN
                 TYPE *,' ERROR IN SP_WAIT ', RETCODE,' TOT_FRAMES:',IREC
         ENDIF
         NFRAMES=IREC
         CALL SP_GET_HEADER(lun2,dsbuf1,RETCODE)
```

```
      IF(RETCODE.NE.1) GO TO 9000
      dsbuf1(131)=LPCORDER
      dsbuf1(158)=1
      dsbuf1(159)=1
      CALL DOUBLE(BETA,dsbuf1(164),2)! PRE-EMPHASIS
      CALL DOUBLE(FRAMEPER,dsbuf1(166),2)
      CALL DOUBLE(WINDOWLEN,dsbuf1(168),2)
      CALL DOUBLE(NFRAMES,dsbuf1(170),2)
      CALL COPY(NUMBYTES,DSBUF2(214),DSBUF1(214))
      CALL SP_PUT_HEADER(LUN2,dsbuf1,RETCODE)
      IF(RETCODE.EQ.1) GO TO 9001
C
9000  CONTINUE
      type *,'SP_SOFT error IN FILE:',DSFILE(1:DSLEN),' ERR:',RETCODE
9001  continue
      CALL SP_CLOSE(lun1,RETCODE)
      CALL SP_CLOSE(lun2,RETCODE)
      GO TO 1000
1001  STOP
      END
!
!<<<<<<<<<<<<<<<<<<<<<<<<<<<<<<<<<<<>>>>>>>>>>>>>>>>>>>>>>>>>>>>>>>>>>
!
      Subroutine ZC1
      Integer*2 speech_in(1),window_samples,frame_samples,rec_index
      Real*4 speech(400),rect,alpha,preemph,energy,zero_cross
     1      ,beta,spechin(400)
      Integer*2 zc_int,sign_prev,sign_current,bin,sign_prev_orig,
     1      sign_current_orig,level1,level2,noise_level !
      Entry ZCR_INIT(window,frame,sample_freq,preemph,noise_level)
      level1 = noise_level
      level2 = - noise_level
      window_samples = window * sample_freq
      frame_samples  = frame  * sample_freq
      rec_index = (window_samples - frame_samples) + 1
      Beta = preemph    ! pre-emphasis coefficient
      slast = 0.
      SIGN_PREV = 1
      sign_prev_orig = 1
      return !     Main entry point
!
              entry zcr2(speech_in,bin,energy)
!
!     float the speech samples
              do j=1,window_samples
                      spechin(j) = float(speech_in(j))
              end do
C     PRE-EMPHASIS
      SPEeCH(1)=SPECHIN(1)-beta*SLAST
      DO 42 I=2,window_samples
42      SPEECH(I)=SPECHIN(I)-BETA*SPECHIN(I-1)
        SLAST=SPECHIN(frame_samples)
      if (slast.ge.level1)then
      sign_prev_orig =1
      elseif(slast.le.level2)then
      sign_prev_orig = -1
      endif !
!     zero crossing computation
!
      bin = 0 ! reset zcr counter
      energy_real = 0.
      do j=1,window_samples
      if (speech(j).ge.level1)then
              sign_current=1
      elseif(speech(j).le.level2)then
              sign_current=-1
      endif
```

```
        if(sign_current.ne.sign_prev)then! zc occurred
        update counter
                bin = bin + 1
        endif
        sign_prev = sign_current
        energy_real = energy_real + (speech(j)**2/float(window_samples))
        end do
        energy = sqrt(energy_real)
        return
        end
```

Program Duration  --  6/6/83 8:40 pm
! This program creates a sorted array of durations of a set of segmented
! files, and also gives average and standard deviations of the durations
! The inputs are:
!       1. Name of a file that contains the filenames of the segmented
!               files
!       2. Number of segmented files
!       3. Filename for output file
!
! The output is:
!       A file, with filename as specified, containing the ordered
!       durations, average durations and standard deviations
!               (all values are multiplied by 1000 for visual comfort).
!
!
!<<<<<<<<<<<<<<<<<<<<<<<<<<<<<<<>>>>>>>>>>>>>>>>>>>>>>>>>>>>>>>>>>>
!
```
        Dimension Tstx(25),duration(5000),Avg_Duration(25),Std_Dev_Duration(25)
     1          ,Sq_Duration(25)
        Character*128 listfile,filename,outfile
        Integer*2 total_files,file_counter,ni(5000),filelen,outfile_len
        Integer*2 header(256),ierr2
        Integer*2 begin_address,mode
        Integer*2 mark_time,num_of_duration,mark_time_old,lun
!
!
        do j=1,5000
        ni(j) = j
        end do
        type *, ' Input the filename containing the list of files'
        Read(5,1)filelen,listfile
        type *,' Input total number of files in the list, # of seg in the word'
        Read(5,*)total_files,mark_time_old
        type *, ' Output filename'
        Read(5,1)outfile_len,outfile
1       format(q,a)
        Open(unit=10,status='old',file=listfile(1:filelen),err=100)
        file_counter = 0
        lun = 11
2       continue
        Read(10,1)filelen,filename
        if(filelen.eq.0)go to 2000 ! eof condition
        file_counter = file_counter + 1
        Call sp_open_old(lun,'#'//filename(1:filelen),ierr2)
        If(ierr2.ne.1) then
        write(5,33)filename(1:filelen),ierr2
33      format(' Error in opening the file ',a,' error = ',i5)
        go to 1000
        endif
        call sp_get_header(lun,header,ierr2)
        If(ierr2.ne.1) then
        write(5,3)filename(1:filelen),ierr2
3       format(' Error in getting the header in file ',a,' error = ',i5)
        go to 1000
        endif
        mark_time = header(214)
        If(mark_time.eq.0.or.mark_time.ne.mark_time_old)then
        write(5,4)filename(1:filelen),mark_time,mark_time_old
4       format('Error in mark_time ' a,2(i4,4x))
!       go to 1000
        mark_time = mark_time_old       ! defaults to what we specify 6/6/83
        endif
```

```
              location = 215
              do j=1,mark_time
              call COPY(4,HEADER(LOCATION),TSTX(J))
              location = location + 2
              end do
       num_of_duration = mark_time - 1
       if((num_of_duration*total_files).gt.5000)then
       write(5,5)
5      format(' Number of files too much for the dimension of Duration(.)')
       go to 1000
       endif
              do j = 1,num_of_duration
       duration(file_counter+((j-1)*total_files))=tstx(j+1)-tstx(j)
              end do
              call sp_close(lun,ierr2)
              if(ierr2.ne.1)then
              Write(5,6)filename(1:filelen),ierr2
6      format('Error in closing ',a, ': ',i4)
              go to 1000
              endif
       go to 2 ! fetch segment info from next file
2000   continue ! all segment info from all files are in
!      check whether total_files equal file_counter.
       if(file_counter.ne.total_files)then
       write(5,7)file_counter,total_files
7      format('<<<WARNING: File_counter does not match
      1 Total_files>>> file_counter:',i4,'total_files: ',i4)
       write(5,8)
8      format(' File_counter value used in processing')
       endif
              do j = 1,num_of_duration
              avg_duration(j) = 0.
              sq_duration(j) = 0.
              do k=(((j-1)*file_counter)+1),(j*file_counter)
              avg_duration(j)=avg_duration(j)+duration(k)
              sq_duration(j) = sq_duration(j) + (duration(k)**2.)
              end do
              sq_duration(j) = sq_duration(j)/float(file_counter)
              avg_duration(j) = avg_duration(j)/float(file_counter)
              std_dev_duration(j)= sq_duration(j) - (avg_duration(j)**2.)
              if(std_dev_duration(j).le.0.)then
              write(5,9)j,sq_duration(j),avg_duration(j)
9      format(' negative or zero varriance!',i3,f10.7,3x,f10.7)
              std_dev_duration(j) = 0.
              else
              std_dev_duration(j) = sqrt(std_dev_duration(j))
              endif
              end do
!      Sorting the durations in ascending order
              do j=1,num_of_duration
              begin_address = 1 +(j-1)*file_counter
              mode =1
              call bfrs(duration,begin_address,file_counter,mode,ni)
              end do
       Open(unit=12,file=outfile(1:outfile_len),status='new')
              write(12,10)outfile(1:outfile_len)
10     format(5x,'Input list file is: ',a)
              write(12,11)(avg_duration(j),j=1,num_of_duration)
11            format('average durations:',<num_of_duration>(f6.4,2x))
              write(12,12)(std_dev_duration(j),j=1,num_of_duration)
12     format(' Standard Dev durations: ',<num_of_duration>(f6.4,2x))
!      Writing out the ascending order of durations
              do j= 1,file_counter
       write(12,14)j,(duration(((k-1)*file_counter)+j),k=1,num_of_duration)
14     format(3x,i4,3x,<num_of_duration>(f7.4,3x))
              end do
       close(unit=12)
1000   continue
100    continue
       stop
       end
```

```
6/15/83. REDONE TO CORRECT INFINITE LOOP IN THE OUTPUT ROUTINE.
6/13/83. Redone to write titles properly.
6/9/83. DONE FOR YOSHINO. WORKS WITH ZCR AND NOT ZCI
6/7/83 PM. REDONE FOR YOSHINO. MARK_TIME MISMATCH ALLOWED.
Program FEADUR generates the features(analog) file corresponding
to the ZIN files, and rank orders the features at each reference
point. The inputs are:

1. Name of a file containing Zcr file names
                2. Total number of files in #1,mark_time and
                        reference frame period in milliseconds
                3. Word Name
                4. Name of the file with average duration The outputs are:

1. *.Zea file, a formatted file containing
                        1. # of reference frames
                        2. two FEATURES OF ORIGINAL SPEECH
                        3. two FEATURES OF PREEMPH SPEECH
                2. 'word'.Znk file, a formatted file of rank ordered
                        analog features for each ref frame of the word

!<<<<<<<<<<<<<<<<<<<<<<<<<<<<<<<<<<<>>>>>>>>>>>>>>>>>>>>>>>>>>>>>>>>>>>>>>>>>>>

Character*128 filein,filernk,feafile,durfile,word,filelpc,fileds
        character*128 dummy
        Integer*2 len_filein,len_filernk,len_feafile,len_durfile,len_word,
     1          len_fileds,len_filelpc
        Integer*2 total_files,file_counter,mark_time,num_of_duration,
     1          header(256),total_frames,lpc_param(5000),lpc_order,
     2          header_lpc(256)
        Integer*2 fil1(500),fil2(500),fil3(500),fil4(500),delta_fil1(500),
     1.         delta_fil2(500),delta_fil3(500),delta_fil4(500)
        Integer*2 fil1_pre(500),fil2_pre(500),fil3_pre(500),fil4_pre(500),
     1          delta_fil1_pre(500),delta_fil2_pre(500),delta_fil3_pre(500),
     2          delta_fil4_pre(500)
        Integer*2 tr_fil1(5000),tr_fil2(5000),tr_fil3(5000),tr_fil4(5000),
     1          tr_delta_fil1(5000),tr_delta_fil2(5000),tr_delta_FIL3(5000),
     2          TR_DELTA_FIL4(5000),NI(5000)
        Integer*2 tr_fil1_pre(5000),tr_fil2_pre(5000),tr_fil3_pre(5000),
     1          tr_fil4_pre(5000),tr_delta_fil1_pre(5000),
     2          tr_delta_fil2_pre(5000),tr_delta_fil3_pre(5000),tr_delta_fil4_
     3          pre(5000)
        Real*4 avg_duration(100),tstx(100)
        integer*2 ref_points(100),total_ref_frames,numbytes
        parameter lun = 15, alpha = 0.9375
        Include 'speech:header1.frm'

!       Input through unit 10

Read(10,1)len_filein,filein
1       format(q,a)
        Read(10,1)len_word,word
        Read(10,1)len_durfile,durfile
        Read(10,*)total_files,mark_time,ref_frame_period
        ref_frame_period = ref_frame_period * .001 !convert to seconds
!       End input from unit 10

Open(unit=12,file=durfile(1:len_durfile),status='old')
                read(12,110)len_dummy,dummy
110     format(q,a)
                num_of_duration = mark_time - 1
                read(12,11)(avg_duration(j),j=1,num_of_duration)
11              format('average durations:',<num_of_duration>(f6.4,2x))
        close(unit=12)
        compute the number of reference frames in each duration do j = 1, num_of_duration
        ref_points(j) = nint(avg_duration(j)/ref_frame_period)
        end do
        total_ref_frames = 0
        do j=1,num_of_duration
        total_ref_frames = total_ref_frames + ref_points(j)
        end do
```

```
         file_counter = 0
         open(unit=12,file=filein(1:len_filein),status='old',err=100)
2        continue
         read(12,1)len_fileds,fileds
         if(len_fileds.eq.0)goto200 ! end of files
         file_counter = file_counter + 1
         call sp_open_old(lun,'#'//fileds(1:len_fileds),ierr)
         if (ierr.ne.1) then
         write(5,3)ierr,fileds(1:len_fileds)
3        format('SP_open_error :',i4,2x,a)
         go to 300 ! stop condition
         endif
         call sp_get_header(lun,header1,ierr)
         If (ierr.ne.1)then
         write(5,4)ierr,fileds(1:len_fileds)
4        format('SP_get_header error: ',i4,2x,a)
         go to 300 ! stop condition
         endif
!        if(header1(214).ne.mark_time)then
!        write(5,44)fileds(1:len_fileds),header1(214),mark_time
!44      format('Mark_time error >>',a,2x,2(i4,2x))
!        goto 300
!        endif
!        mark_time = header1(214)
         numbytes = mark_time * 4
         call copy(numbytes,header1(215),tstx(1))
         feafile = fileds(1:(len_fileds-5))//'Zea'
         lpc_order = sdl_ordrlpc
         itotal = spl_totalwrds   ! total words sought
         lrecl = 1
         istart= 1
         nframes = spl_totfrms  ! total number of frames
         call sp_read(lun,lrecl,istart,itotal,nwrds,lpc_param,ierr)
         if(ierr.eq.1)then
         do k=1,nframes
         fil1(k) = lpc_param(((k-1)*(lpc_order+2))+1)
         fil2(k) = lpc_param(((k-1)*(lpc_order+2))+2)
         end do
         else
         write(5,10)fileds(1:len_fileds),ierr
         go to 300
         endif
         call sp_close(lun,ierr)
         If (ierr.ne.1)then
         write(5,5)ierr,fileds(1:len_fileds)
         format('SP_close error: ',i4,2x,a)
5        go to 300 ! stop condition
         endif
10       format('SP_read error :',a,2x,i4)
!        Trend functions
         delta_fil1(1) = 0
         delta_fil2(1) = 0
         do j=2,nframes
         delta_fil1(j) = fil1(j) - fil1(j-1)
         delta_fil2(j) = fil2(j) - fil2(j-1)
         end do !        Identify the reference registration points within each segment
!        and load the tr_   arrays
!
         open(unit=16,file=feafile(1:len_fileds-2),status='new')
         write(16,*) total_ref_frames
         write(16,*)(ref_points(j),j=1,num_of_duration)
         index = file_counter   ! index to tr_ array loading
         do j=1,num_of_duration
             if (ref_points(j).ne.0)then
         delta_tau = (tstx(j+1) - tstx(j))/float(ref_points(j))
             do k=1,ref_points(j)
             tau = tstx(j) + (delta_tau*(k-0.5))
             iframe = NINT(1E3*tau/spl_frmprd+1.0)
             if (iframe.gt.nframes) iframe=nframes
!            CHECK IF THE FRAME IS IN THE SEGMENT <<<<< 1/5/82
```

```
209         CONTINUE
            TEMP_TIME = IFRAME * (SP1_FRMPRD *1E-3)
            IF(TEMP_TIME.GT.TSTX(J+1))THEN
                    IFRAME = IFRAME-1
                    GO TO 209
            ENDIF
            IF(TEMP_TIME.LT.TSTX(J))THEN
                    IFRAME = IFRAME +1
            ENDIF  !  AVOID LOOPING INFINITE TIMES tr_fill(index) = fill(iframe)
            tr_fil2(index) = fil2(iframe)
            tr_delta_fill(index) = delta_fill(iframe)
            tr_delta_fil2(index) = delta_fil2(iframe)

write(16,*)
    1 iframe,tr_fill(index),tr_DELTA_fill(index),
    2 tr_fil2(index),tr_delta_fil2(index)
            index = index + total_files
            end do
            endif
      end do
            close(unit=16)
      go to 2 ! fetch next file name to be processed
200   continue
!
!   SORTING THE FEATURE VARIABLES for each reference frame
!  ie = 1
      mode = 1
      do j=1,5000
      ni(j)=j
      end do
      do j = 1,total_ref_frames
      index = (j-1)*total_files +1
      call bfis(tr_fill(index),ie,total_files,mode,ni)
      call bfis(tr_fil2(index),ie,total_files,mode,ni)
      call bfis(tr_delta_fill(index),ie,total_files,mode,ni)
      call bfis(tr_delta_fil2(index),ie,total_files,mode,ni)
      end do
      output section
      filernk = word(1:len_word)//'.Znk'
      call output(tr_fill,tr_DELTA_fill,tr_fil2,tr_DELTA_fil2,
    1      tr_fil3,tr_fil4,
    1      tr_delta_fil3,tr_delta_fil4,
    1      total_files,total_ref_frames,filernk,
    2      len_word+4)
)     continue
)     continue
      stop
      end
      Subroutine Output(a,b,c,d,e,f,g,h,total_files,nframes,chrstring,len)
      INTEGER*2  a(1),b(1),c(1),d(1),e(1),f(1),g(1),h(1)
      character*128 chrstring,chr
      integer*2 total_files,nframes,len,total,totall,fix
      Open(unit=17,file=chrstring(1:len),status='new')
      write(17,1)chrstring(1:len)
      format(4x,a,/)
      total = total_files * nframes
      totall = total
      fix =0
      ICOUNTER = 1
      if(nframes.gt.18)then
       total = total_files * 18
      icounter =2
      endif
0     continue
      format(2x,a,/)
      format(1h1)
      format(1x,i3,2x,18(i4,2x))
      format(1x,i3,2x,18(i4,2x))
      chr=' RMS ENERGY'
      write(17,2)chr
      do j=1, total_files
      write(17,3)j,(a(k),k=fix+1+(j-1),total,total_files)
      end do
```

```fortran
            write (17,4)
            chr =' DELTA RMS ENERGY'
            write(17,2)chr
            do j=1, total_files
            write(17,3)j,(b(k),k=fix+1+(j-1),total,total_files)
            end do
            write (17,4)
            chr =' ZCR: PREEMPHASIZED SIGNAL'
            write(17,2)chr
            do j=1, total_files
            write(17,5)j,(c(k),k=fix+1+(j-1),total,total_files)
            end do
            write (17,4)
!           chr =' DELTA ZCR: PREEMPHASIZED SIGNAL'
!           write(17,2)chr
!           do j=1, total_files
!           write(17,5)j,(d(k),k=fix+1+(j-1),total,total_files)
!           end do
!           write (17,4)
!
            if (icounter .eq. 2) then
            fix = 18*total_files
            total = totall
            ICOUNTER = 0      ! AVOID INFINITE LOOP
            go to 110 !
            endif
            CLOSE(UNIT=17)
            return
            end
!       PROGRAM TEMPLATE1 -- UTILIZES 1 BIT ENERGY DESCRIPTION ALSO. 7/27/83 PM
!       PROGRAM TEMPLATE -- unified template generation program. 7/21/83 pm
            character*128 chrstring,chr,dum,template_file
            integer*2 total_files,nframes,len,total,totall,fix,t1,t2,t3,TEO
            integer*2 a(10000),c(10000),code(4,100),min_code,temp(4),code1(2,100)
            real*4 avg_energy(100),percent_pre(4,100),counter_pre(4,100),
           1                              max_avg_energy,PERCENT(2,100),
           2                              counter(2,100)
!
!           Input quantities
                type *,' Input filename'
                read(5,1) len,chrstring
                type *,' Input total_files,nframes'
                read(5,*)total_files,nframes
                type *, ' Input Template file name'
                read(5,1)lent,template_file
                type *,' Input the ZCR thresholds : t1,t2,t3'
                read(5,*)t1,t2,t3
                type *, ' Input the energy threshold: TEO'
                read(5,*)teo
1           format(q,a)
!           end input
            Open(unit=17,file=chrstring(1:len),status='old')
            read(17,1)len,dum
            read(17,1)len,dum
            total = total_files * nframes
            totall = total
            fix =0
            ICOUNTER = 1
            if(nframes.gt.18)then
             total = total_files * 18
             icounter =2
            endif
110         continue
2           format(2x,a,/)
4           format(1h1)
3           format(1x,i3,2x,18(i4,2x))
5           format(1x,i3,2x,18(i4,2x))
            read(17,2)chr
            do j=1, total_files
            read (17,3)jk,(a(k),k=fix+1+(j-1),total,total_files)
            end do
```

```
      read(17,1)len,dum
      read (17,2)chr
      do j=1, total_files
      read(17,5)jk,(c(k),k=fix+1+(j-1),total,total_files)
      end do
      read(17,1)len,dum if (icounter .eq. 2) then
      fix = 18*total_files
      total = total1
      ICOUNTER = 0      ! AVOID INFINITE LOOP
      go to 110 !
      endif
      CLOSE(UNIT=17)
!
!     Begin processing
!
      do k = 1, nframes
            jbegin = ((k-1)* total_files ) + 1
            jend   = jbegin + total_files - 1
            avg_total = total_files avg_energy(k) = 0.
            do j = jbegin, jend Logarithmic averaging of energy
                  if(a(j).le.0)then         ! degenerate case
                        avg_total = avg_total -1
                  else                      ! normal case
                        avg_energy(k) = avg_energy(k) +
     1                                     alog10(float(a(j)))
                  endif

1-BIT ENERGY HISTOGRAM if(a(j).le.teo)then
                        counter(1,k) = counter(1,k) + 1
                  else
                        counter(2,k) = counter(2,k) + 1
                  endif
                  ZCR Histogram
                  if(c(j).le.t1)then
                        counter_pre(1,k) = counter_pre(1,k)+1
                  elseif(c(j).le.t2)then
                        counter_pre(2,k) = counter_pre(2,k) +1
                  elseif(c(j).le.t3) then
                        counter_pre(3,k) = counter_pre(3,k) +1
                  else
                        counter_pre(4,k) = counter_pre(4,k) + 1.
                  endif end do          !     end of processing k-th reference frame avg_energy(k) = avg_energy(k) / avg_total
            avg_energy(k) = 10.** avg_energy(k)
      end do
            close(unit=17)

max_avg_energy = 0.
      do iframe=1,nframes
            if(avg_energy(iframe).ge.max_avg_energy)
     1                  max_avg_energy = avg_energy(iframe)
            do j=1,4
                  percent_pre(j,iframe) = 100. *
     1                  (counter_pre(j,iframe)/float(total_files))
                  temp(j) = 10 - int(percent_pre(j,iframe)/10.)
            end do
                  min_code = min(temp(1),temp(2),temp(3),temp(4))
            do j=1,4
                  code(j,iframe) = temp(j) - min_code
            end do
```

```
            do j=1,2
                    percent(j,iframe) = 100. *
    1                   (counter(j,iframe)/float(total_files))
                    temp(j) = 10 - int(percent(j,iframe)/10.)
            end do
                min_code = min(temp(1),temp(2))
            do j=1,2
                    code1(j,iframe) = temp(j) - min_code
            end do
        end do do k = 1,nframes
                avg_energy(k) = avg_energy(k)/max_avg_energy
        end do
!       Output file generation
        Open(unit=18,file=template_file(1:lent),type='new')
        write(18,*)'       ',' FILENAME: ', template_file(1:lent)
        write(18,*)'       ',' INPUT FILE : ',chrstring(1:50)
        write(18,*)'       ',' Total Files : ', total_files
        write(18,*)'       ',' Total Ref Frames: ', nframes
        Write(18,300) max_avg_energy
300     format(5x,' MAX ENERGY: ',F10.2)
        Write(18,*)'       ',' ZCR Thresholds : ', T1,T2,T3
        write(18,*)'       ',' Energy Threshold: ', teo
        write(18,*)' '
        do k=1,nframes
                write(18,301) k,avg_energy(k),(percent(j,K),j=1,2),
    1           (code1(j,k),j=1,2),(code(j,k),j=1,4),
    1                                   (percent_pre(j,k),j=1,4)
        end do
301     format(5x,i3,3x,f6.2,2(3x,f6.1),2(3x,i4),4(3x,i4),4(3x,f6.1))
        close(unit=18)
        stop
        end
```

DATA2:[SPCH30.JAPAN]MAGIC,-
DATA2:[SPCH30.JAPAN]NEWDTW,-
DATA2:[SPCH30.JAPAN]matchnew,-
DATA2:[SPCH30.JAPAN]refnew,-
data2:[spch30.japan]zcgen PROGRAM MAGIC            ! is a mod of COMPOSITE to include\
! word pair logic to disambiguate responses and hence improve
! performance.
!                   August 10,1983 5:45 pm
!       IAMB = 1 FLAG TO SHOW THAT AMBIGUOUS RESPONSES NEED TO BE
!                           HANDLED
!       NAMB = # OF AMBIGUOUS RESPONSES THAT NEED TO BE RESOLVED
!       RESP(J) = J-TH AMBIGUOUS RESPONSE
!       ALTER(J)= ALTERNATE RESPONSE TO THE J-TH AMBIGUOUS RESP
!       DIF(J) = DIFFERENTIAL COST (ICOST(ALTER(J)-ICOST(RESP(J))
!                   IF NOT EXCEEDED WILL RESULT IN THE
!                   RESPONSE RESP(J) TO BE CHANGED TO ALTER(J).

COMPOSITE is the most comprehensive driver, and by parametric
inputs can be chosen to be in one of many configurations.
The key inputs are the following 3 bits of information:

IEM = 1  -- ENERGY WEIGHTING .  0 -- NO ENERGY WEIGHTING
        IRE = 1  -- ENERGY & ZCR FEA .  0 -- ZCR FEATURE ONLY
        ILEN= 1  -- WORD LENGTH NORM .  0 -- NO WORD LENGTH NORM

NOTE: If IEM=1 and ILEN=1, word length is the effective wordlength,
and if IEM=0 and ILEN=1, word length is the total number of reference
frames for the hypothesized word.

DISTANCE MEASURE: The distance measure is logarithmic, yielding
a maximum likelihood function. That is, if the probability of
an event (zcr,energy) is P, the distance is given by -100 * log(P).
The scale factor of 100 is introduced for resolution convenience,
and the distance itself is rounded off to the nearest integer.
Center clipped zcr is facilitated. Energy is used to do startpoint
detection.

```
!   ---------------------------------------------------------------
!           +------------------------------------- TEO
!           | +----------------------------------- T1
!           | | +--------------------------------- T2
!           | | | +------------------------------- T3
!           | | | | +----------------------------- ENLVL
!           | | | | | +--------------------------- WINDOW OPTION
!           | | | | | | +------------------------- IFW
!           | | | | | | | +----------------------- IEW
!           | | | | | | | | +---------------------
!           | | | | | | | | | +-------------------
!          40,25,70,125,25,1,0,5,0,0,4,1,0,0,1
!          3                              | | |----ILEN
!          ICH                            | +------IRE
!          13                             |--------IEM
!          data2:[spch30.japan]JICH.zcp
!          NI
!          13
!          data2:[spch30.japan]JNI.zcp
!          SAN
!          15
!          data2:[spch30.japan]JSAN.zcp
!          data2:[spch30.japan]ICHDS.dat
!          data2:[spch30.japan]JSIX3A.del
!          data2:[spch30.japan]JSIX3A.RES
!
!<<<<<<<<<<<<<<<<<<<<<<<<<<<<<<<<<<>>>>>>>>>>>>>>>>>>>>>>>>>>>>>>>>
        integer*2       buf1(800),buf2(400),nfrms(20),len1(20),ifrms(20),
     1                  zcr(400),energy(400),t0,t1,t2,t3,
     2                  ifm,R1,R2,R3,R4,R5,ivote(14,7),RE1,RE2,TEO
        INTEGER*4       REF(10000)
        integer*2       file_counter,reject_count,sub_count,rec_count,
     1                  tie_index, min_index,TOTAL_FRAMES
        integer         ibias(20),ICONF(7)
        INTEGER*2       IAMB,NAMB,ALTER(20),RESP(20),DIF(20)
        INTEGER*2       NOISE_LEVEL,tweight(7)
        real*4          bias(20),ccost(20),WT(7,50),BETA,WTIN
        logical*2       tie,PURETIE
        character*128   lpcfile,zcrfile,ref_file(20),test_file_list,
     1                  output_file,output_file2
        character*16    words(20)
        common/cost/    icost(20)
        common/zero/    iznum(400)
        common/lev/     level,ifw,iew,iwoption
        COMMON/PRINT/   IPRINT                    ! PRINT OPTION FOR DP MATCH
!
        do j=1,7
          ICONF(J)=0
          tweight(j)=0
          do i=1,14
            ivote(i,j)=0
          end do
        end do do j=1,7
          do k=1,50
            wt(j,k)=0.
          end do
        end do
!-------------------------------------------------------------------
!                       INPUT FILE READING
!
1       format(q,a)
        read(10,*)tEO,t1,t2,t3,level,iwoption,
     1                  ifw,iew,iprint,NOISE_LEVEL,BETA,IEM,ITPT
     2                  ,IRE,ILEN,IAMB
!       IF ITPT =1, TEMPLATE IS PRINTED.
!       IAMB =1 MEANS AMBIGUITIES NEED TO BE RESOLVED.
        READ(10,*)NAMB
        DO J=1,NAMB
        READ(10,*)RESP(J),ALTER(J),DIF(J)
        END DO
```

```
        read(10,*)nwords                  ! total number of words
        do j=1,nwords
        read(10,1)len,words(j)            ! spelling of the j-th word
        read(10,*)nfrms(j)                !      number of reference frames for
        read(10,1)len1(j),ref_file(j)     ! ref file the word j
        end do
!       read the list of test files
        read(10,1)len2,test_file_list
        read(10,1)len3, output_file       ! unit 14
        read(10,1)len4,output_file2       !unit 15
!       end reading the set up variables
!
!
!       read ref data : one word at a time
!
        jbegin = 1        ! memory organization
        INDEX = 1
        do j=1,nwords
            ifrms(j) = jbegin
            open(unit=20,file=ref_file(j)(1:len1(j)),type='old')
            read(20,1)len,dum
            read(20,1)len,dum
            read(20,1)len,dum
            read(20,1)len,dum
            read(20,1)len,dum
            read(20,1)len,dum
            read(20,1)len,dum
            read(20,1)len,dum
            do iframe=1,nfrms(j)
           read(20,*)ifm,wtin,f11,f12,RE1,RE2,R1,R2,R3,R4,f1,f2,
1                                                           f3,f4
            IF(IEM.EQ.1) THEN        ! ENERGY WEIGHTING & NORM
              wt(j,iframe) = AMIN1(BETA*WTIN,1.)*100
            ELSE
              WT(J,iFRAME)  = 100
            ENDIF
            if (f11.LE.0.) F11 = 0.001
                 RE1 = NINT(-100*ALOG10(F11/100.))
            if (f12.LE.0.) F12 = 0.001
                 RE2 = NINT(-100*ALOG10(F12/100.))
            if (f1.LE.0.) F1 = 0.001
                 R1 = NINT(-100*ALOG10(F1/100.))
            if (f2.LE.0.) F2 = 0.001
                 R2 = NINT(-100*ALOG10(F2/100.))
            if (f3.LE.0.) F3 = 0.001
                 R3 = NINT(-100*ALOG10(F3/100.))
            if (F4.LE.0.) F4 = 0.001
                 R4 = NINT(-100*ALOG10(F4/100.))
             REF(INDEX  ) = (R1+IRE*RE1)*wt(j,iframe)/100.
             REF(INDEX+1) = (R2+IRE*RE1)*wt(j,iframe)/100.
             REF(INDEX+2) = (R3+IRE*RE1)*wt(j,iframe)/100.
             REF(INDEX+3) = (R4+IRE*RE1)*wt(j,iframe)/100.
             REF(INDEX+4) = (R1+IRE*RE2)*wt(j,iframe)/100.
             REF(INDEX+5) = (R2+IRE*RE2)*wt(j,iframe)/100.
             REF(INDEX+6) = (R3+IRE*RE2)*wt(j,iframe)/100.
             REF(INDEX+7) = (R4+IRE*RE2)*wt(j,iframe)/100.
             min_ref = min(ref(index),ref(index+1),ref(index+2),
1                          ref(index+3),ref(index+4),ref(index+5),
2                          ref(index+6),ref(index+7))
             do ji = index, index+7           ! remove bias
                ref(ji) = ref(ji) - min_ref
             end do
            index = INDEX +8
            tweight(j)=tweight(j)+wt(j,iframe)
           end do
           jbegin = index
        end do
!
        open(unit=12,type='old',file=test_file_list(1:len2))
        open(unit=14,type='new',file=output_file(1:len3))
        IF(Ire.EQ.1)THEN ! 2 FEATURES -- ENERGY AND ZCR
     WRITE(14,*)'  1-BIT ENERGY, 2-BIT ZCR RECOGNIZER'
        ELSE    ! 1 FEATURE -- ZCR ONLY
```

```
      WRITE(14,*)'   2-BIT ZCR RECOGNIZER'
      endif
      IF(IEM.EQ.1)THEN
      WRITE(14,*)'  FEATURES ARE >>>> ENERGY WEIGHTED <<<<'
      ELSE
      WRITE(14,*)'  FEATURES ARE <<<NOT>> ENERGY WEIGHTED'
      ENDIF
      IF(ILEN.EQ.1) THEN  ! WORD LENGTH NORMALIZE USED
      WRITE(14,*)'  WORD LENGTH >>>>NORMALIZED<<<<'
      ELSE     ! NO WORD LENGTH NORMALIZE USED
      WRITE(14,*)'  >>>NO<<< WORD LENGTH NORMALIZATION'
      ENDIF
      IF(IAMB.EQ.1)THEN
      WRITE(14,*) ' >>>WORD PAIR DISCRIMINATION USED<<<'
      ENDIF
      WRITE(14,*)'   - local stretch slide           '
       IF(IAMB.EQ.1)THEN
             WRITE(14,*)NAMB,(RESP(J),ALTER(J),DIF(J),J=1,NAMB)
       ENDIF
       WRITE(14,*) ' KEY PARAMS: ', ' IEM: ',IEM,' IRE: ',IRE,
      1                          ' ILEN: ',ILEN
      WRITE(14,*)'    tEO      t1      t2      t3  '
      write(14,*)      TEO  ,  T1,     T2,     T3
      write(14,*)'    level  noise_level   iwoption    ifw     iew '
      write(14,*)     level , noise_level,  iwoption , ifw,    iew
      WRItE(14,*)'    WORD NUMBER  PRINT-OPTION       BETA '
      WRITE(14,*)         nwords  ,    IPRINT,         BETA
!
!
      do j=1,nwords
        WRITE(14,*)' ',words(j)(1:10),' frame:',nfrms(j),ref_file(j),ibias(j)
      end do
!     read the list of test files
      WRITE(14,*)' ',test_file_list(1:len2)
      WRITE(14,*)' ', output_file(1:len3)
      WRITE(14,*)' '
!
      read(12,*)inword         !      index of the input set of words
      file_counter = 0
2     read(12,1)lenzcr,zcrfile
      if (lenzcr.eq.0) go to 200     ! end of processing
      file_counter = file_counter +1
      call zcr_gen(zcrfile(1:lenzcr),lenzcr,noise_level,zcr,
     1                    energy,total_frames)
      do j=1,total_frames
            iznum(j)=zcr(j)
!     IF(ENERGY(J).LE.NOISE_LEVEL)ZCR(J)=0   ! NOISE FRAME ELIMINATION
            if(zcr(j).le.t1)then
                  zcr(j) = 1
            else if(zcr(j).le.t2)then
                  zcr(j) = 2
            else if(zcr(j).le.t3)then
                  zcr(j) = 3
            else
                  zcr(j) = 4
            endif
            IF(ENERGY(J).GT. TEO)THEN
                  ZCR(J) = 4 + ZCR(J)        ! ENERGY FEATURE INCORPORATED
            ENDIF
      end do
      call LINMTCH(nwords,words,nfrms,ifrms,ref,zcr,energy,total_frames)
!     Process the results to obtain meaningful stats
!
!
!     Bias removal from the accumulated costs
      ISHORTFLG=0
      tie=.false.
      do j=1,nwords
        if (icost(j).eq.1000000) then
!         ****** NO-PROCESSING ********
        else
            IF(ILEN.EQ.1)THEN ! WORD LENGTH NORMALIZATION
            icost(j) = 1000*(icost(j))/tweight(j)
```

```
                    ELSE         ! NO LENGTH NORMALIZATION
                    ICOST(J) = 10 * ICOST(J)              ! SAME SPREAD OF VALUES
                    ENDIF
            end if
        end do
!
!       cost voting for histgram : 6/27/83
!
        do j=1,nwords
                if      (icost(j).lt.50) then
                            ivote(1,j)=ivote(1,j)+1
                else if (icost(j).lt.100) then
                            ivote(2,j)=ivote(2,j)+1
                else if (icost(j).lt.200) then
                            ivote(3,j)=ivote(3,j)+1
                else if (icost(j).lt.300) then
                            ivote(4,j)=ivote(4,j)+1
                else if (icost(j).lt.500) then
                            ivote(5,j)=ivote(5,j)+1
                else if (icost(j).lt.1000) then
                            ivote(6,j)=ivote(6,j)+1
                else if (icost(j).lt.2000) then
                            ivote(7,j)=ivote(7,j)+1
                else if (icost(j).lt.5000) then
                            ivote(8,j)=ivote(8,j)+1
                else if (icost(j).lt.10000) then
                            ivote(9,j)=ivote(9,j)+1
                else if (icost(j).lt.500000)then
                            ivote(10,j)=ivote(10,j)+1
                else if (icost(j).EQ.1000000)then
                            ivote(11,j)=ivote(11,j)+1
                            ISHORTFLG=ISHORTFLG+1
                end if
        end do
!---------------------------------------------------------------------
        min_index   = 1
        min_cost    = icost(1)
        PURETIE     = .FALSE.
        do j=1,nwords
                if(icost(j).lt.min_cost)then
                        min_cost = icost(j)
                        min_index=j
                end if
        END DO
!
!       MINIMUM COST COUNT
!
        ITIECOUNT=0
        DO J=1,NWORDS
            IF(ICOST(J).EQ.MIN_COST) THEN
                ITIECOUNT=ITIECOUNT+1
            END IF
        END DO
!---------------------------------------------------------------------
        IF (ITIECOUNT.GE.2) THEN     ! if there are over two mincost then reject
            PURETIE = .TRUE.
                GO TO 888            ! SKIP HIGH LEVEL LOGIC.  NEEDS IMPROVEMENT
        END IF
!
!                       HIGH LEVEL LOGIC FOR DISAMBIGUATION
        IF (IAMB.EQ.1)THEN           !INVOKE THE LOGIC
                DO J=1,NAMB
                IF(MIN_INDEX.EQ.RESP(J))THEN    !CHECK
        IF((ICOST(ALTER(J))-ICOST(RESP(J))).LE.DIF(J))THEN
                            MIN_INDEX = ALTER(J)
                            GO TO 888
            ENDIF
                ENDIF
                END DO
        END IF
888             CONTINUE
```

```
!------------------------------------------------------------
!              Ouput the scores
!------------------------------------------------------------
       if(puretie) then  !       tie         reject option write(14,*)' ',zcrfile(1:lenzcr),'  is REJECTED <<<<<'
        REJECT_COUNT = REJECT_COUNT + 1
        WRITE(14,*)MIN_INDEX,' ',TIE_INDEX,' Reject Count : ',
      1                                           reject_count
                  !   no tie
       ELSE
        IF(min_index.eq.inword)then     ! correct recognition
         write(14,*)' ',zcrfile(1:lenzcr),' was correctly RECOGNIZED'
         REC_COUNT = REC_COUNT + 1
         WRITE(14,*)MIN_INDEX,'  Recognition Count : ',REC_COUNT
        ELSE                            !     Substitution
         write(14,*)' ',zcrfile(1:lenzcr),'  Error: SUBSTITUTION ****'
         sub_count = sub_count +1
         write(14,*)min_index,' Substitution Count : ', sub_count
        endif
!
       endif
!------------------------------------------------------------
!    <<<<<<< CONFUSION MATRIX GENERATION >>>>>>>>>
!
       IF (PURETIE) THEN
            ICONF(NWORDS+1)=REJECT_COUNT
       ELSE
            DO K=1,NWORDS
              IF(MIN_INDEX.EQ.K) THEN
                 ICONF(K)=ICONF(K)+1
              END IF
            END DO
       END IF
!------------------------------------------------------------
       WRITE(14,*) (ICOST(J),J=1,NWORDS) ! ALL COSTS WRITTEN OUT
       go to 2
!
200    continue                              ! summarize
!
       open(unit=15,file=output_file2(1:len4),type='new')
       IF(Ire.EQ.1)THEN ! 2 FEATURES -- ENERGY AND ZCR
       WRITE(15,*)'  1-BIT ENERGY, 2-BIT ZCR RECOGNIZER'
       ELSE     ! 1 FEATURE -- ZCR ONLY
       WRITE(15,*)'  2-BIT ZCR RECOGNIZER'
       endif
       IF(IEM.EQ.1)THEN
       WRITE(15,*)'  FEATURES ARE >>>> ENERGY WEIGHTED <<<<'
       ELSE
       WRITE(15,*)'  FEATURES ARE <<<NOT>> ENERGY WEIGHTED'
       ENDIF
       IF(ILEN.EQ.1) THEN ! WORD LENGTH NORMALIZE USED
       WRITE(15,*)'  WORD LENGTH >>>>NORMALIZED<<<<'
       ELSE    ! NO WORD LENGTH NORMALIZE USED
       WRITE(15,*)'  >>>NO<<< WORD LENGTH NORMALIZATION'
       ENDIF
       IF(IAMB.EQ.1)THEN
       WRITE(15,*)'  >>>WORD PAIR DISCRIMINATION USED<<<'
       ENDIF
       WRITE(15,*)'    - local stretch slide           '
       WRITE(15,*) ' KEY PARAMS: ', ' IEM: ',IEM,' IRE: ',IRE,
      1                                  ' ILEN: ',ILEN
       IF(IAMB.EQ.1)THEN
              WRITE(14,*)NAMB,(RESP(J),ALTER(J),DIF(J),J=1,NAMB)
       ENDIF
       WRITE(15,*)'    tE0     t1      t2      t3   '
       write(15,*)     TE0 ,   T1,     T2,     T3
       write(15,*)'   level noise_level   iwoption    ifw    iew '
       write(15,*)    level , noise_level, iwoption , ifw,   iew
       WRITE(15,*)'   WORD NUMBER  PRINT-OPTION      BETA '
       WRITE(15,*)      nwords  ,    IPRINT,         BETA
```

```
           do j=1,nwords
             WRITE(15,*)' ',words(j)(1:10),' frame:',nfrms(j),ref_file(j)
           end do
!          read the list of test files
           WRITE(15,*)' ',test_file_list(1:len2)
           WRITE(15,*)' ', output_file(1:len3)
           WRITE(15,*)' '
           write(15,*)' Total Number of files : ', file_counter
           write(15,*)' Correctly Recognized  : ', rec_count
           write(15,*)' Substituted           : ', sub_count
           write(15,*)' Rejected              : ', reject_count
!
           write (15,998)
           do j=1,nwords
              write(15,999) j,(ivote(i,J),i=1,11)
           end do
998        format(//'    cost distribution voting ')
999        format(   '  word#:',I3,'!',14I4)
!
           WRITE(15,997)
           WRITE(15,996)
           WRITE(15,995) (ICONF(J),J=1,NWORDS+1)
997        FORMAT(//'            CONFUSION MATRIX DATA    ')
996        FORMAT(   '  -------------------------------------')
995        FORMAT('      ',8I4)
           IF(ITPT.EQ.1)THEN
           i=1     ! reference pointer set
           DO J=1,NWORDS
              WRITE (15,*)'   Template data >> word ',j,'   Neff',tweight(j)
              do k=1,nfrms(j)
           write(15,11)k,INT(wt(j,k)),'|',ref(i),ref(i+1),ref(i+2),
          1                            ref(i+3),
          2                            REF(I+4),REF(I+5),REF(I+6),REF(I+7)
              i=i+8
             end do
           end do
11         format(2x,i4,2x,i4,2x,a,2x,8(i5,2x))
           ENDIF             ! CONDITION FOR TEMPLATE PRINT OUT
           stop
           end
!      FILENAME: NEWDTW.FOR  -- 8/1/83. I*4 COSTS. BETTER  BEGIN POINT
       SUBROUTINE LINDP(zcr,iref,nfrms,iwindow,mincost,energy,tfms)
!-----------------------------------------------------------------
           INTEGER*2  ZCR(*),IBEGIN,NFRMS,IWINDOW,energy(*)
           INTEGER*2  TFMS,KSTART,KEND
           INTEGER*4  IREF(8,*),M1,M2,M3,ACCM(200)
           LOGICAL*2  IP,ISKIP
           COMMON/PRINT/IPRINT
           COMMON/LEV/LEVEL,IFW,IEW,IWOPTION
           common/zero/iznum(400)
           do k=1,200                            !initialize
              accm(k)=0
           end do
           ISKIP=.FALSE.
!-----------------------------------------------------------------
!      ENERGY START POINT DETECT LOGIC
!-----------------------------------------------------------------
           iflg=0
           j=1
1          if(energy(j).gt.level) then        !
               Istart =J                      ! energy up point save
               IFLG   =1                      ! loop jump flag set
           END IF                             !
           j=j+1
           IF (IFLG.EQ.1) GOTO 5              ! loop jump?
           go to 1

5          if(energy(j).gt.level) then
               iflg=1
           else
               iflg=0
           endif
           j=j+1
           if(iflg.eq.0) goto1
```

```
        if(energy(j).gt.level) then
            iflg=1
        else
            iflg=0
        endif
        j=j+1
        if(iflg.eq.0) goto1
!------------------------------------------
10      if(energy(j).lt.level) then        ! energy end point detect
            iend  =j                       ! loop jump flg set
            iflg  =0                       !
        end if                             !
        j=j+1
        if (iflg.eq.0) goto 30             ! loop jump?
        go to 10
!------------------------------------------
!       WINDOW DECISION OPTION
!------------------------------------------
30      IF (IWOPTION.EQ.1) THEN
            kstart = istart - ifw
            kend   = istart + iew
        ELSE
            kstart = iend -ifw - nfrms
            kend   = iend +iew - nfrms
        END IF
        if (kstart.lt.1) kstart=1
        IF (KSTART+NFRMS-1.GT.TFMS) THEN
            ISKIP=.TRUE.
            mincost=1000000
            goto 200
        ENDIF
        IF (KEND+NFRMS.GT.TFMS) THEN
            KEND=TFMS-NFRMS+1
        END IF
!------------------------------------------
        IF (ISKIP) GOTO 200
!------------------------------------------
        DO K=KSTART,KEND                   ! line slide
            IP=.FALSE.
            do j=1,nfrms                   ! distance compute
                M1=300000
                M2=300000
                M3=300000
                IF (IP) GOTO 100
            m1=iref(zcr(j-1+k-1),j)
100         m2=iref(zcr(j  +k-1),j)
            m3=iref(zcr(j+1+k-1),j)
            minimum = MIN(m1,m2,m3)
            ACCM(k)=ACCM(k)+minimum
                IF (MINIMUM.EQ.M3) IP=.TRUE.
                IF (MINIMUM.EQ.M2) IP=.FALSE.
                IF (MINIMUM.EQ.M1) IP=.FALSE.
            END DO                         !
        END DO                             !
!------------------------------------------
        mincost=1E6
        DO K=KEND,KSTART,-1                ! min-cost search
            IF(ACCM(K).LE.mincost) THEN    !
                mincost = ACCM(K)          !
                min_idx = k                !
            END IF                         !
        END DO                             !
!------------------------------------------
200     IF(IPRINT.EQ.1)THEN        ! PRINT OPTION THROUGH UNIT 10 IN RDRIVER
        IF (ISKIP) THEN
            WRITE(30,*)'<<<<<<<<<<<<<<<<<<< REJECT <<<<<<<<<<'
            GOTO 300
        END IF
        write(30,*)'<min-',mincost,'      <s-',kstart,'      <e-',kend
        do j = 1,tfms
            if (j.le.nfrms-1) then
                iaccm=0
            else
```

```
                  iaccm=accm(j-nfrms+1)
            end if
         if ((j.ge.min_idx).and.(j.lt.min_idx+nfrms)) then
            write(30,*) '  ++',j,iznum(j),zcr(j),energy(j),'  ',iaccm
         else
            write(30,*) '    ',j,iznum(j),zcr(j),energy(j),'  ',iaccm
         end if
         end do
         ENDIF
------------------------------------------------------------------
300      RETURN
         END !     7/28/83.  ref and iref are I*4.  newname: matchnew.for
!     file name: newmatch 7/27/83 pm.  energy feature included.
!     Routine linmatch is almost the same as match2 modified to be used
!     with linear time slide routine.

SUBROUTINE linmtch(NWORDS,WORDS,NFRMS,IFRMS,REF,ZCR,ENERGY,TFMS)
!
!>>>>>>>>>> THIS PROGRAM MUST BE USED FOR NEW DISTANCE MEASURE <<<<<<<<
!
!
!        nwords  : number of vocabrary
!         words  : the spelling for each of the words (not used now)
!         nrfms  : the number o reference frames or each word
!         ifrms  : the starting frame number for each word
!           ref  : the reference features for each ref frame
!           zcr  : input speech 2-bit compressed zcr
!        energy  : input speech energy
!          tfms  : total_number of frames...input pattern
!
      INTEGER*2   NWORDS,NFRMS(*),IFRMS(*),ZCR(*),ENERGY(*)
      INTEGER*2   RFMAX,IFMAX,MAX_WINDOW,MIN_WINDOW,TFMS
      INTEGER*2   INPUT(100),ifend,iwindow
      integer*4   ref(*),iref(8,100)
      CHARACTER*16 WORDS(*)
      COMMON/COST/ ICOST(20)
!
!
      DO NW=1,NWORDS IF (TFMS.LT.NFRMS(NW))THEN
           ICOST(NW) = 1000000       !REJECT IF FILE IS TOO SHORT
      ELSE
      IWINDOW = TFMS - NFRMS(NW) + 1

CALL LINRF(REF,NW,IFRMS,NFRMS,IREF)

CALL LINDP(zcr,iref,nfrms(nw),iwindow,ICOST(NW),energy,tfms)
      ENDIF
      END DO
!
      RETURN
      END !     7/28/83. file:refnew.for.  Iref and Ref are I*4
!     NewREf includes energy feature. 7/27/83
      SUBROUTINE LINRF (REF,NW,IFRMS,NFRMS,IREF)
!
!<<<<<<<<<<<<<<< PROBABILITY WEIGHTED MEASURE >>>>>>>>>>>>>>>>>>>>
!<<<<<<<<<<<<<<<    5 range input feature     >>>>>>>>>>>>>>>>>>>>
!
!
      INTEGER*2 NW,IFRMS(*),NFRMS(*),RFMAX
      integer*4 ref(*),iref(8,*)
```

```
         INDEX = IFRMS(NW)
         DO NF=1,NFRMS(NW)
           DO K=1,8
             IREF(K,NF)=REF(INDEX+k-1) ! insert ref frame distance
           END DO
           INDEX = INDEX + 8
         END DO
         RETURN
         END
!        The file ZCGEN.FOR consists of two subroutines: ZC_GEN, and ZCR.
!        ZCGEN does file management, data fetch, and calls ZCR to perform
!        the chores of zcr and energy computation.
!
C
C<<<<<<<<<<<<<<<<<<<<PROGRAM BEGINS>>>>>>>>>>>>>>>>>>>>>>>>>>>
C
         Subroutine ZCR_GEN(dsfile,dslen,noise_level,zcr,energy,total_frames)
!
         CHARACTER*80 DSFILE,LPCFILE
         INTEGER*2 LPCORDER,WINDOWTYPE,RETCODE
         INTEGER*2 DSBUF(3000),dsbuf1(2560),DSBUF2(2560)
         INTEGER*2 zcr(400),energy(400),total_frames,bin,NOISE_LEVEL
         INTEGER*4 NFRAMES
         INTEGER*4 IREC,NWRDS,WORDSWANT
         REAL ALPHA,FRAMEPER,WINDOWLEN,BETA
         Parameter (frameper=20.,windowlen=30.,lpcorder=0,beta=0.9375)
         CHARACTER*8 SDNAME
         CHARACTER*78 NDESCR
         INTEGER*2 LRECL
         INTEGER*2 DSLEN
         integer*2 lun1,lun2
         lun1 = 1
1000     CONTINUE
1        FORMAT(Q,A)
C        OPEN INPUT AND OUTPUT FILES
         CALL SP_OPEN_OLD(lun1,'#'//DSFILE(1:DSLEN),RETCODE)
         IF(RETCODE.NE.1) GO TO 9000
5        CONTINUE
         CALL SP_GET_HEADER(lun1,DSBUF,RETCODE)
         IF(RETCODE.NE.1) GO TO 9000
         T=DSBUF(66)/1E6
         SAMPLE_FREQ = 1./(T*1000.)
         CALL zcr_INIT(WINDOWLEN,FRAMEPER,SAMPLE_FREQ,BETA,noise_level)
C
         RETCODE=0
         IREC=0
C
40       CONTINUE
         ctime = (irec+0.5)*frameper/1E3
         call SP_GET_FRAME (lun1, ctime, windowlen, dsbuf1, npoints, retcode)
         if (retcode.eq.1601) go to 8000 !end of file, stop
         if (retcode.ne.1) go to 9000 !GET_FRAME error, stop
                 call zcr2(dsbuf1,bin,energy_real)
         IREC = IREC + 1
                 zcr(irec) = bin
                 energy(irec) = energy_real
         GO TO 40      ! END PROCESSING for zcr and energy
8000     CONTINUE
         total_frames = irec
         CALL SP_WAIT(LUN1,RETCODE)
         IF(RETCODE.NE.1)THEN
                 TYPE *,' ERROR IN SP_WAIT ', RETCODE, 'total frames: ',irec
                 total_frames = total_frames-1
                 GO TO 9000
         ENDIF
         NFRAMES=IREC
         go to 9001
9000     CONTINUE
```

```
      type *,'SP_SOFT error in file: ',dsfile(1:dslen),' ', retcode
9001  continue
      CALL SP_CLOSE(lun1,RETCODE)
1001  return
      END
!
!
      Subroutine ZC1
!
!<<<<<<<<<<<<<<<<<<<<<<<<<<<<<<<<<>>>>>>>>>>>>>>>>>>>>>>>>>>>>>>>>>>>>
!
      Integer*2 speech_in(1),window_samples,frame_samples,rec_index
      Real*4 speech(400),rect,alpha,preemph,energy,zero_cross
     1       ,beta,spechin(400)
      Integer*2 zc_int,sign_prev,sign_current,bin,sign_prev_orig,
     1          sign_current_orig,level1,level2,noise_level
!
      Entry ZCR_INIT(window,frame,sample_freq,preemph,noise_level)
      level1 = noise_level
      level2 = - noise_level
      window_samples = window * sample_freq
      frame_samples  = frame  * sample_freq
!     rec_index = (window_samples - frame_samples) + 1
      Beta = preemph    ! pre-emphasis coefficient
      slast = 0.
      SIGN_PREV = 1
      sign_prev_orig = 1
      return
!
!     Main entry point
!
              entry zcr2(speech_in,bin,energy)
!
!     float the speech samples
              do j=1,window_samples
                    spechin(j) = float(speech_in(j))
              end do
C     PRE-EMPHASIS
      SPEeCH(1)=SPECHIN(1)-beta*SLAST
      DO 42 I=2,window_samples
42      SPEECH(I)=SPECHIN(I)-BETA*SPECHIN(I-1)
      SLAST=SPECHIN(frame_samples)
      if (slast.ge.level1)then
      sign_prev_orig =1
      elseif(slast.le.level2)then
      sign_prev_orig = -1
      endif
!
!     zero crossing computation
!
      bin = 0 ! reset zcr counter
      energy_real = 0.
      do j=1,window_samples
      if (speech(j).ge.level1)then
            sign_current=1
      elseif(speech(j).le.level2)then
            sign_current=-1
      endif
      if(sign_current.ne.sign_prev)then! zc occurred
!     update counter
            bin = bin + 1
      endif
      sign_prev = sign_current
      energy_real = energy_real + (speech(j)**2/float(window_samples))
      end do
      energy = sqrt(energy_real)
      return
      end
```

What is claimed is:

1. A word recognition system for identifying a spoken word independent of the speaker thereof, wherein the spoken word is represented by an analog speech signal, said word recognition system comprising:

signal conditioning means including energy measuring circuit means and zero-crossing detector means for receiving an input analog speech signal and providing word-discrimination information as a sequence of feature vectors based solely upon enery measurements as provided by said energy measuring circuit means and the zero-crossing rate of the input analog speech signal as determined by said zero-crossing detector means to the exclusion of other speech parameters;

memory means storing a plurality of reference templates of digital speech data respectively representative of individual words comprising the vocabulary of the word recognition system, the vocabulary consisting of a relatively small number of words with each of the words included in the vocabulary being represented by a reference template, each of said reference templates corresponding to a word acoustically distinct from other words included in the vocabulary;

each of said reference templates being defined by a predetermined plurality of reference vectors arranged in a predetermined sequence and comprising an acoustic description of an individual word in a time-ordered sequence of acoustic events, each reference vector corresponding to one of the acoustic events as determined by a zero-crossing rate and an energy measurement of a reference analog speech signal corresponding to an individual word and representing a plurality of probabilistic events corresponding in number to the total number of values potentially assumable by a feature vector such that each of the probabilistic events is based upon the relative likelihood of occurrence of an acoustic event therein as compared to the other probabilistic events of the same reference vector;

means operably coupled to the outputs of said energy measuring circuit means and said zero-crossing detector means of said signal conditioning means for extracting feature vectors from said input analog speech signal, an acoustic event being described by the value of each feature vector;

means operably associated with said feature vector extracting means for comparing each feature vector of said input analog speech signal with the corresponding reference vectors of each of said reference templates to provide a distance measure with respect to each of the reference vectors in the predetermined sequences defining acoustic descriptions of the respective words included in the vocabulary of the word recognition system; and means for determining which one of the plurality of reference templates is the closest match to said input analog speech signal based upon a cumulative cost profile as defined by the respective distance measures provided by comparisons of each feature vector of said input analog speech signal with the reference vectors included in the predetermined sequences of reference vectors defining the plurality of reference templates.

2. A word recognition system as set forth in claim 1, wherein said memory means, said features vector extracting means, said comparing means, and said match-determining means are all components of a single integrated circuit chip controller means.

3. A word recognition system as set forth in claim 2, wherein said controller means is a microprocessor.

4. A word recognition system as set forth in claim 2, wherein said controller means is a microcomputer.

5. A word recognition system as set forth in claim 1, further including means for establishing a decision window covering a selected time interval of a portion of the complete time interval required by the input analog speech signal during which said determining means makes a decision as to the particular reference template which is the closest match to said input analog speech signal.

6. A word recognition system as set forth in claim 1, further including word-pair discrimination means for compensating for the bias caused by the tendency of one word in a given pair of words to be falsely recognized as the other word of the pair such that interpretation of the cumulative cost profile provided by comparisons of each fature vector of said input analog speech signal with the reference vectors included in the predetermined sequences of reference vectors defining the plurality of reference templates by said determining means is improved in selecting the reference template representative of the correct word of the given word-pair.

7. A word recognition system as set forth in claim 1, wherein each feature vector comprises three data bits, one bit being indicative of energy and two bits being indicative of the zero crossing rate of the input analog speech signal.

8. A word recognition system as set forth in claim 7, wherein the plurality of reference vectors comprising each reference template are a plurality of reference frames, each reference frame being represented by eight distances depending upon the relative probability of each of eight acoustic events as described by the three data bits comprising respective feature vectors.

9. A word recognition system as set forth in claim 1, wherein time alignment means operably associated with the output of said distance measure means are provided for mapping reference times of each of the reference templates with the temporal evolution of the input analog speech signal in the comparison of acoustic events such that each of said reference templates is slid linearly along each of the feature vectors of the sequence of feature vectors provided from the input analog speech signal to develop the acoustic event within said plurality of reference templates having the minimum deviation with respect to the feature vectors of the input analog speech signal as to time alignment.

10. A word recognition system as set forth in claim 1, wherein said plurality of reference templates are representative of respective words subjected to word length normalization and ideal bias removal.

11. A word recognition system as set forth in claim 10, wherein the effective word length of each word as represented by said plurality of reference templates is provided by a summation of the energy weighting over all of the reference frames comprising the word and defining the energy weighted distance by the energy weighting summation.

12. An electronic device comprising:
integrated circuit means including
memory means having digital speech data stored therein, a first portion of said memory means being devoted to a plurality of reference templates of digital speech data respectively representative of individual words comprising the vocabulary of a word recognition capability, the vocabulary consisting of a relatively small number of words with each of the words included in the vocabulary being represented by a reference template defined by a predetermined plurality of reference vectors arranged in a predetermined sequence and comprising an acoustic description of an individual word in a time-ordered sequence, each of said reference templates corresponding to a word acoustically distinct from other words included in the vocabulary, said memory means having a second portion thereof devoted to digital speech data from which words, phrases and sentences of synthesized speech may be derived,
controller means for selectively accessing digital speech data from said first portion of said memory means devoted to said plurality of reference templates and from said second portion of said memory means devoted to said digital speech data from which synthesized speech may be derived, and
speech synthesizer means operably coupled to said controller means and to said memory means for selectively accessing digital speech data in response to instructions from said controller means and generating analog speech signals representative of human speech in response to the selectively accessed digital speech data from said memory means;
signal conditioning means for receiving an input analog speech signal representative of a spoken word and providing word-discriminationn information as a sequence of feature vectors defining acoustic descriptions of the word;
said controller means and said first portion of said memory means devoted to said plurality of reference templates cooperating to define word recognition means for receiving said word-discrimination information representative of said input analog speech signal;
said controller means including comparator means for comparing each feature vector of said input analog speech signal with the corresponding reference vectors of each of said reference templates stored within said first portion of said memory means to provide a distance measure with respect to each of the reference vectors in the predetermined sequences defining acoustic descriptions of the respective words as represented by said plurality of reference templates;
said controller means further including logic circuit means for determining which one of the plurality of reference templates is the closest match to said input analog speech signal based upon a cumulative cost profile as defined by the respective distance measures provided by comparisons of each feature vector of said input analog speech signal with the reference vectors included in the predetermined sequences of reference vectors defining the plurality of reference templates;
said controller means being responsive to the recognition of the word represented by said input analog speech signal based upon the particular reference template decided upon by said logic circuit means to selectively access digital speech data from the second portion of said memory means reflective of the word recognition;
said speech synthesizer means being responsive to the selectively accessed digital speech data reflective of the word recognition for generating analog speech signals representative of human speech in some way related to the recognized word; and
audio means coupled to the output of said speech synthesizer means for producing audible human speech from said analog speech signals generated by said speech synthesizer means having some relationship to the recognized word.

13. An electronic device as set forth in claim 12, wherein said integrated circuit means is a single semiconductor chip.

14. An electronic device as set forth in claim 12, wherein each reference vector of said plurality of reference templates is based upon a zero-crossing rate and an energy measurement of a reference analog speech signal corresponding to an individual word, and said word-discrimination information representative of said input analog speech signal including energy measurements and the zero-crossing rate of the input analog speech signal.

15. An electronic device as set forth in claim 14, wherein said predetermined plurality of reference vectors is the same number for each word of which said plurality of reference templates is representative.

16. An electronic device as set forth in claim 14, wherein said signal conditioning means includes energy measuring circuit means and zero-crossing detector means respectively receiving said input analog speech signal for providing said energy measurements and a zero-crossing count with respect to the input analog speech signal.

17. A method for recognizing individual words of speech independent of the speaker thereof from a vocabulary consisting of a limited number of words, said method comprising the steps of:
establishing a data base from a population of different speakers uttering the same list of a limited number of individual words to be included in the vocabulary for which speaker-independent word recognition is to be applicable;
determining a sequence of time-ordered acoustic events based upon a zero-crossing rate and an energy measurement as the sole speech parameters corresponding to each word for each of the different speakers whose utterances are included in the data base;
assigning a probability distribution function of each acoustic event included in each of the sequences of time-ordered acoustic events corresponding to respective individual words to be included in the vocabulary based upon the statistical averages obtained from the data base of the population of different speakers;
representing a plurality of probabilistic acoustic events based upon the probability distribution function of a given acoustic event included in the sequence of acoustic events corresponding to an individual word as a reference vector such that each of the probabilistic acoustic events is based upon the relative likelihood of occurrence of an acoustic event therein;

arranging a set of a plurality of reference vectors in a sequence comprising an acoustic description of an individual word;

generating a reference template of digital speech data representative of an individual word from each set of reference vectors;

measuring an input analog speech signal by substantially simultaneously obtaining energy measurements of said input analog speech signal and sensing zero-crossings of said input analog speech signal to provide word-discrimination information as a sequence of feature vectors, each of which is based solely upon an energy measurement and a zero-crossing rate and defines an acoustic event;

extracting said sequence of feature vectors;

comparing each feature vector of said input analog speech signal as extracted with the corresponding reference vectors of each of a plurality of said reference templates of digital speech data respectively representative of individual words comprising the vocabulary of the limited number of words;

determining a distance measure with respect to the corresponding reference vectors in the predetermined sequences defining acoustic descriptions of the respective words for each feature vector of said input analog speech signal as a result of the comparisons therebetween; and recognizing a word as represented by the input analog speech signal on the basis of determining which one of said plurality of reference templates is the closest match to the input analog speech signal based upon a cumulative cost profile as defined by the respective distance measures provided by the comparison of each feature vector of said input analog speech signal with the reference vectors included in predetermined sequences of reference vectors defining said plurality of reference templates.

18. A method for recognizing a word as set forth in claim 17, further including establishing a decision window covering a selected time interval of a portion of the complete time interval required by the input analog speech signal during which the decision is made as to the particular reference template which is the closest match to said input analog speech signal.

19. A method for recognizing a word as set forth in claim 17, further including developing word-pair associations in the vocabulary of the limited number of words as determined by sound similarities therebetween; and during the word-recognition determination, compensating for the bias caused by the tendency of one word in a given pair to be falsely recognized as the other word of the pair such that interpretation of the cumulative cost profile provided by the comparisons of each feature vector of said input analog speech signal with the corresponding reference vectors of each of said reference templates is improved in selecting the correct word of the given word-pair as represented by the input analog speech signal.

20. A method for recognizing a word as set forth in claim 17, further including time aligning said sequence of feature vectors of the input analog speech signal with corresponding reference vectors of a reference template representative of a hypothesized word by mapping reference times of each of said plurality of reference templates with the temporal evolution of the input analog speech signal in the comparisons of feature vectors and reference vectors which define acoustic events by sliding each of said reference templates along the input analog speech signal to develop the acoustic event within said plurality of reference templates having the minimum deviation with respect to the input analog speech signal as to time alignment.

* * * * *